(12) United States Patent
Coyle

(10) Patent No.: US 9,233,294 B1
(45) Date of Patent: Jan. 12, 2016

(54) BASEBALL TECHNOLOGIES

(71) Applicant: Thomas J. Coyle, Sparta, NJ (US)

(72) Inventor: Thomas J. Coyle, Sparta, NJ (US)

(*) Notice: Subject to any disclaimer, the term of this patent is extended or adjusted under 35 U.S.C. 154(b) by 217 days.

(21) Appl. No.: 14/104,045

(22) Filed: Dec. 12, 2013

(51) Int. Cl.
*A63B 71/06* (2006.01)

(52) U.S. Cl.
CPC .................... *A63B 71/0605* (2013.01)

(58) Field of Classification Search
CPC ............ A63F 2300/80; A63F 2300/8011; A63F 2300/8023; A63F 2300/8052; A63F 2300/53; A63F 2300/55; G07F 17/3202; G07F 17/3206; G07F 17/3225
See application file for complete search history.

(56) References Cited

U.S. PATENT DOCUMENTS

| | | | |
|---|---|---|---|
| 6,042,492 A * | 3/2000 | Baum | A63B 24/0003 434/257 |
| 8,172,722 B2 | 5/2012 | Molyneux et al. | |
| 8,303,387 B2 | 11/2012 | Spivack | |
| 8,333,670 B2 | 12/2012 | Ono | |
| 9,072,953 B2 * | 7/2015 | Moore | A63B 63/00 |
| 2007/0072705 A1 * | 3/2007 | Ono | A63B 24/0003 473/451 |
| 2009/0189982 A1 | 7/2009 | Tawiah | |
| 2013/0040714 A1 | 2/2013 | Rosing | |

OTHER PUBLICATIONS

Virtual Baseball Baseball and Softball Training Through Advanced Technology/Professional Instruction for Every Aspect of the Game . . . Website Mar. 20, 2013 Two Pages.
Shoorthing Virtual Realty Simulators Website Mar. 20, 2013 Three Pages.
Visual Sports VisualBaseball—Virtual Baseball Simulator Website Mar. 20, 2013 Two Pages.

* cited by examiner

*Primary Examiner* — Tramar Harper
*Assistant Examiner* — Jeffrey Wong
(74) *Attorney, Agent, or Firm* — Goldstein Law Offices, P.C.

(57) ABSTRACT

A technology for playing baseball is provided. The technology enables real-time baseball gameplay between a first team associated with a first baseball field and second team associated with a second baseball field.

19 Claims, 16 Drawing Sheets

US 9,233,294 B1

BASEBALL TECHNOLOGIES

TECHNICAL FIELD

Generally, the present disclosure relates to sports. More particularly, the present disclosure relates to baseball.

BACKGROUND

In the present disclosure, where a document, an act and/or an item of knowledge is referred to and/or discussed, then such reference and/or discussion is not an admission that the document, the act and/or the item of knowledge and/or any combination thereof was at the priority date, publicly available, known to the public, part of common general knowledge and/or otherwise constitutes prior art under the applicable statutory provisions; and/or is known to be relevant to an attempt to solve any problem with which the present disclosure may be concerned with.

Baseball is a popular game typically played between two teams at an outside baseball field. However, such gameplay is often dependent on various factors. For example, one factor is weather as baseball games are often cancelled due to various environmental conditions, such as snow, rain, winds, and so forth. Another factor is travel as baseball games usually involve teams based out of different geographic locations. Therefore, such travel is time-consuming, expensive, tiring, and logistically complicated. Yet another factor is limited team pool as international gameplay is frequently constrained by security situations, geopolitics, and complicated logistics.

While certain aspects of technologies have been discussed to facilitate the present disclosure, no technical aspects are disclaimed. The claims may encompass at least one of the technical aspects discussed herein.

BRIEF SUMMARY

The present disclosure may address at least one of the above. However, the present disclosure may also prove useful to other technical areas. Therefore, the claims should not be construed as necessarily limited to addressing any of the above.

According to an example embodiment of the present disclosure a system is provided. The system includes a first computer in communication with a plurality of pitch sensors and a fielding machine. The first computer is associated with a first field having a first pitching area and a first plurality of bases including a first catcher base. The first field having the pitch sensors arranged thereabout. The fielding machine is proximal to the first catcher base. The system further includes a second computer in communication with a pitching machine and a plurality of hit sensors. The second computer is associated with a second field having a second pitching area and a second plurality of bases including a second catcher base. The second area having the pitching machine. The second field having the hit sensors arranged thereabout. The pitch sensors obtaining pitch information of a first ball as manually pitched from the first area toward the first catcher base. The first computer receiving, in real-time, the pitch information from the pitch sensors. The second computer receiving, in real-time, the pitch information from the first computer. The pitching machine containing a second ball. The pitching machine receiving, in real-time, the pitch information from the second computer and, in response, pitching the second ball toward the second catcher base based on the pitch information. The hit sensors obtaining hit information of the second ball as manually hit when the pitching machine pitched the second ball. The second computer receiving, in real-time, the hit information from the hit sensors. The first computer receiving, in real-time, the hit information from the second computer. The fielding machine containing a third ball. The fielding machine receiving, in real-time, the hit information from the first computer, and, in response, fielding the third ball based on the hit information.

According to another example embodiment of the present disclosure a method is provided. The method includes coupling a first computer to a plurality of pitch sensors and a fielding machine. The first computer is associated with a first field having a first pitching area and a first plurality of bases including a first catcher base. The first field having the pitch sensors arranged thereabout. The first field having the fielding machine proximal to the first catcher base. The method further includes coupling a second computer to a pitching machine and a plurality of hit sensors. The second computer is associated with a second field having a second pitching area and a second plurality of bases including a second catcher base. The second pitching area having the pitching machine. The second field having the hit sensors arranged thereabout. The method also includes facilitating the pitch sensors obtaining pitch information of a first ball as manually pitched from the first pitching area toward the first catcher base. The first computer receiving, in real-time, the pitch information from the pitch sensors. The second computer receiving, in real-time, the pitch information from the first computer. The pitching machine containing a second ball. The pitching machine receiving, in real-time, the pitch information from the second computer and, in response, pitching the second ball toward the second catcher base based on the pitch information. The hit sensors obtaining hit information of the second ball as manually hit when the pitching machine pitched the second ball. The second computer receiving, in real-time, the hit information from the hit sensors. The first computer receiving, in real-time, the hit information from the second computer. The fielding machine containing a third ball. The fielding machine receiving, in real-time, the hit information from the first computer, and, in response, fielding the third ball based on the hit information.

According to yet another example embodiment of the present disclosure a method is provided. The method is performed via a computer. The method includes receiving, in real-time, manual pitch information sensorily obtained from a first field. The method further includes automatically pitching on a second field, in response to the receiving, based on the pitch information. The method additionally includes receiving, in real-time, manual hit information sensorily obtained from the second field based on the automatically pitching. The method also includes automatically fielding on the first field, responsive to the receiving, based on the hit information.

The present disclosure may be embodied in the form illustrated in the accompanying drawings. However, attention is called to the fact that the drawings are illustrative. Variations are contemplated as being part of the disclosure, limited only by the scope of the claims.

BRIEF DESCRIPTION OF THE DRAWINGS

The accompanying drawings illustrate example embodiments of the present disclosure. Such drawings are not to be construed as necessarily limiting the disclosure. Like numbers and/or similar numbering scheme can refer to like and/or similar elements throughout.

DETAILED DESCRIPTION OF THE PREFERRED EMBODIMENTS

Figure 1:
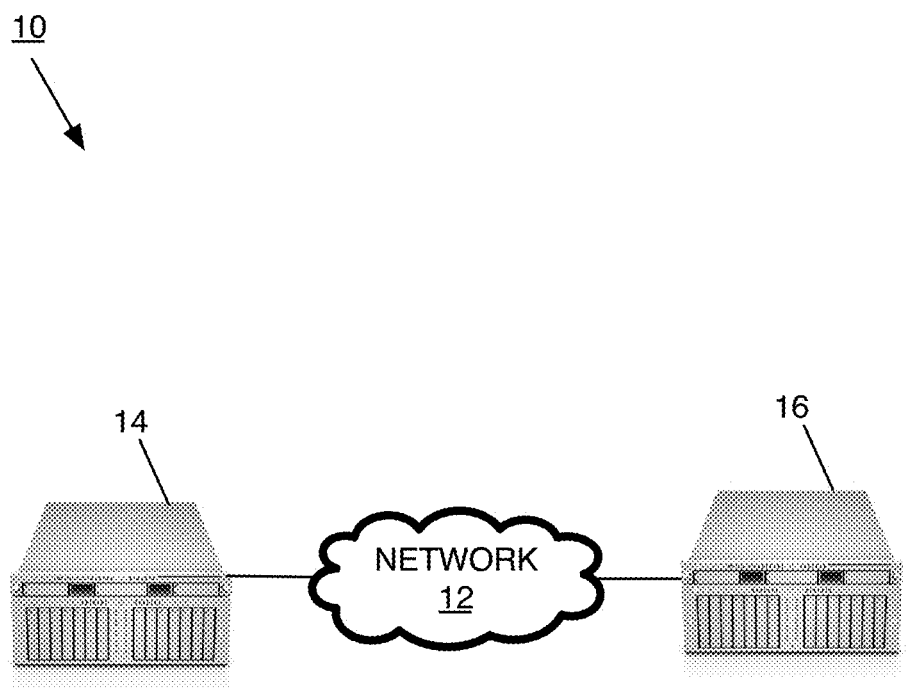
FIG. 1 shows an example embodiment of a network environment according to the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art. In addition, features described with respect to certain example embodiments may be combined in and/or with various other example embodiments. Different aspects and/or elements of example embodiments, as disclosed herein, may be combined in a similar manner. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity in any manner, irrespective of the at least one entity having any relationship to the contents of the present disclosure.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular embodiments only and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof. Further, alternate terminology should not be limited necessarily as exclusionary, but can be inclusionary as well.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three dimensional printing, laser cutting, computer numerical control routing, milling, pressing, stamping, vacuum forming, hydroforming, injection molding, lithography, and so forth.

Any and/or all elements, as disclosed herein, can include, whether partially and/or fully, a solid, including a metal, a mineral, an amorphous material, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, reflection, anti-reflection and/or holography, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible, and/or any other combinations thereof. Any and/or all elements, as disclosed herein, can be identical and/or different from each other in material, shape, size, color and/or any measurable dimension, such as length, width, height, depth, area, orientation, perimeter, volume, breadth, density, temperature, resistance, and so forth.

Unless otherwise defined, all terms, including technical and scientific terms, used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

As described herein baseball gameplay includes softball gameplay, hardball gameplay, and so forth. Further, as described herein baseball gameplay includes recreational baseball gameplay, competitive baseball gameplay, practice baseball gameplay, and so forth.

FIG. 1 shows an example embodiment of a network environment according to the present disclosure. A network environment 10 includes a network 12. Environment 10 also includes a computer 14 in communication with network 12 and a computer 16 in communication with network 12.

Network 12 includes a plurality of nodes, such as a collection of computers and/or other hardware interconnected by communication channels, which allow for sharing of resources and/or information. Network 12 can be wired and/or wireless. Network 12 can allow for communication over short and/or long distances. Network 12 can operate via at least one network protocol, such as Ethernet, a Transmission Control Protocol (TCP)/Internet Protocol (IP), and so forth. Network 12 can have any scale, such as a personal area network, a local area network, a home area network, a storage area network, a campus area network, a backbone network, a metropolitan area network, a wide area network, an enterprise private network, a virtual private network, a virtual network, a satellite network, a computer cloud network, an internetwork, a cellular network, and so forth. Network 12 can be and/or include an intranet and/or an extranet. Network 12 can be and/or include Internet. Network 12 can include other networks and/or allow for communication with other networks, whether sub-networks and/or distinct networks, whether identical and/or different from network 12. Network 12 can include hardware, such as a network interface card, a repeater, a hub, a bridge, a switch and/or a firewall. Network 12 can be operated, directly and/or indirectly, by and/or on behalf of one and/or more entities, irrespective of any relation to computer 14 and/or computer 16.

Computer 14 can be a server, a workstation, a desktop, a tablet, a mobile phone, a supercomputer, and so forth. Computer 16 can be a server, a workstation, a desktop, a tablet, a mobile phone, a supercomputer, and so forth. Computer 14 can be identical to computer 16. Computer 14 can be different from computer 16. Computer 14 can communicate, whether directly, and/or indirectly, with computer 16 over network 12. Alternatively, computer 14 can communicate, whether directly and/or indirectly, with computer 16, while avoiding network 12. Further alternatively, a computer system can include computer 14 and computer 16.

Figure 2:
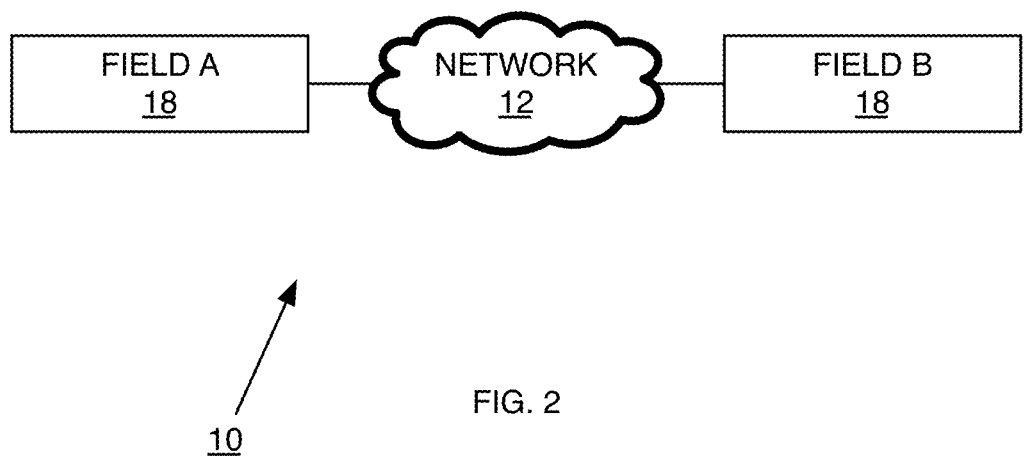
FIG. 2 shows an example embodiment of a plurality of baseball fields in a plurality of locales in communication with each other via a network according to the present disclosure.

FIG. 2 shows an example embodiment of a plurality of baseball fields in a plurality of locales in communication with each other via a network according to the present disclosure. Some elements of this figure are described above. Thus, same and/or similar reference characters identify identical and/or like components described above and any repetitive detailed description thereof will hereinafter be omitted or simplified in order to avoid complication.

A plurality of baseball fields 18 includes a field A and a field B. Field A is associated with computer 14, such as computer 14 being local to field A, remote from field A, and so forth. Field B is associated with computer 16, such as computer 16 being local to field B, remote from field B, and so forth. In other embodiments, field A and field B are associated with computer 14. In yet other embodiments, field A and field B are associated with computer 16. In still other embodiments, only one of computer 14 and computer 16 can associate with field A and field B. Note that in some embodiments, at least one of baseball fields 18 can include an unmarked field where someone desired to pitch and hit. For example, such field can include a park, a plain, a parking lot, a yard, and so forth.

Fields 18 can be identical to each other in any way. Fields 18 can be different from each other in any way. Fields 18 can be of any size, shape, area, and so forth. Fields 18 can be aboveground. Fields 18 can be underground. Fields 18 are in different geographic locales with any distance therebetween. Fields 18 can be located in any time zones. Fields 18 can be within one time zone. For example, field A can be land-based in one country and field B can be land-based in another country. Also for example, field A can be land-based in one state and field B can be land-based in another state. Additionally for example, field A and field B can be land-based, yet spaced apart in one town. Further for example, field A can be on a first marine vessel and field B can be on a second marine vessel. Moreover for example, field A can be in an Eastern Time Zone, such as in New Jersey, and field B can be in a Pacific Time Zone, such as in California. Note that such examples can be combined in any manner. For example, field A can be on a marine vessel in Mediterranean Sea and field B can be land-based in Cranford, N.J.

Figure 3:
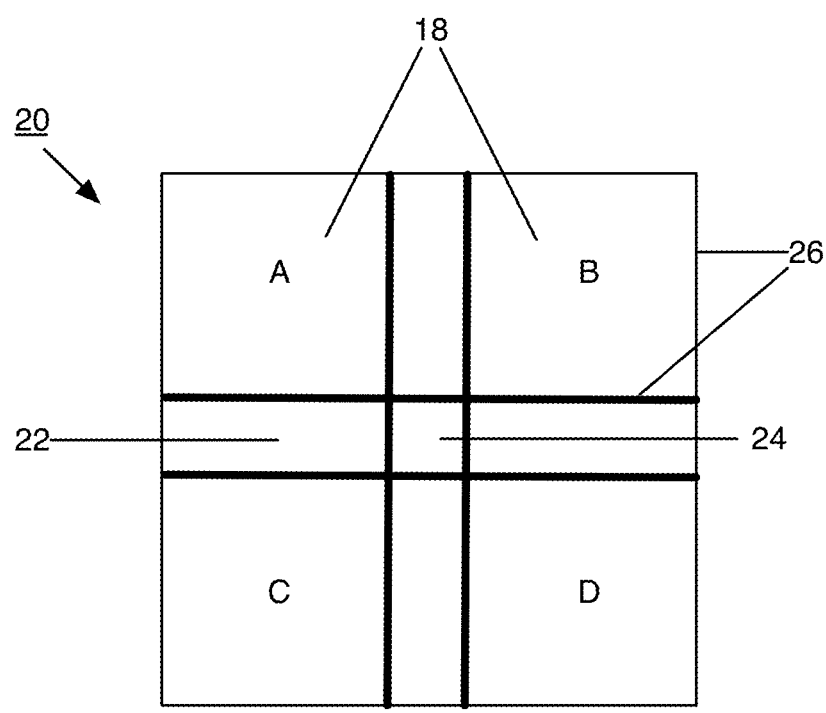
FIG. 3 shows an example embodiment of a plurality of baseball fields in a locale according to the present disclosure.

FIG. 3 shows an example embodiment of a plurality of baseball fields in a locale according to the present disclosure. Some elements of this figure are described above. Thus, same and/or similar reference characters identify identical and/or like components described above and any repetitive detailed description thereof will hereinafter be omitted or simplified in order to avoid complication.

A sports complex 20 includes fields 18, such as field A, field B, field C, and field D. Complex 20 can include any amount of fields 18, such as at least one. Complex 20 can be of any type, shape, size, area, and so forth. Complex 20 can be aboveground and/or underground. Complex 20 can include a spectator area, such as a seating area with at least one bench. Such area can be peripheral to at least one of fields 18. Complex 20 can be battery powered, generator powered, mains electricity powered, renewable energy powered, and so forth. Complex 20 can be standalone and/or be a part of a stadium or another complex, such as an amusement park.

Field A is associated with computer 14, such as computer 14 being local to field A, remote from field A, local to complex 20, remote from complex 20, and so forth. Field B is associated with computer 16, such as computer 16 being local to field B, remote from field B, local to complex 20, remote from complex 20, and so forth. Note that field C can also be associated with a computer, such as computer 14, computer 16, and/or another computer, such as that computer being local to field C, remote from field C, local to complex 20, remote from complex 20, and so forth. Also note that field D can be associated with a computer, such as computer 14, computer 16, and/or another computer, such as that computer being local to field C, remote from field C, local to complex 20, remote from complex 20, and so forth. Further note that at at least two of fields 18, such as field A and field C, can be associated with a computer, such as computer 14, computer 16, and/or another computer, such as that computer being local to field A and/or field C, remote from field A and/or field C, local to complex 20, remote from complex 20, and so forth. Additionally, note that a single computer, such as at least one of computer 14 and computer 16, can be associated with complex 20, such as being local to complex 20, remote from complex 20, and so forth.

A plurality of paths 22 extends between fields 18. Paths 22 meet at a common center 24, which can have a shopping area, an information desk, a ticket window, and so forth. At least one of fields 18 is at least partially enclosed via a barrier 26, such as a fence, a wall, a screen, a mesh, a net, and so forth. Barrier 26 at least partially extends along paths 22. Barrier 26 can include a covering structure, such as a roof, a dome, a screen, a mesh, a net, and so forth.

Figure 4:
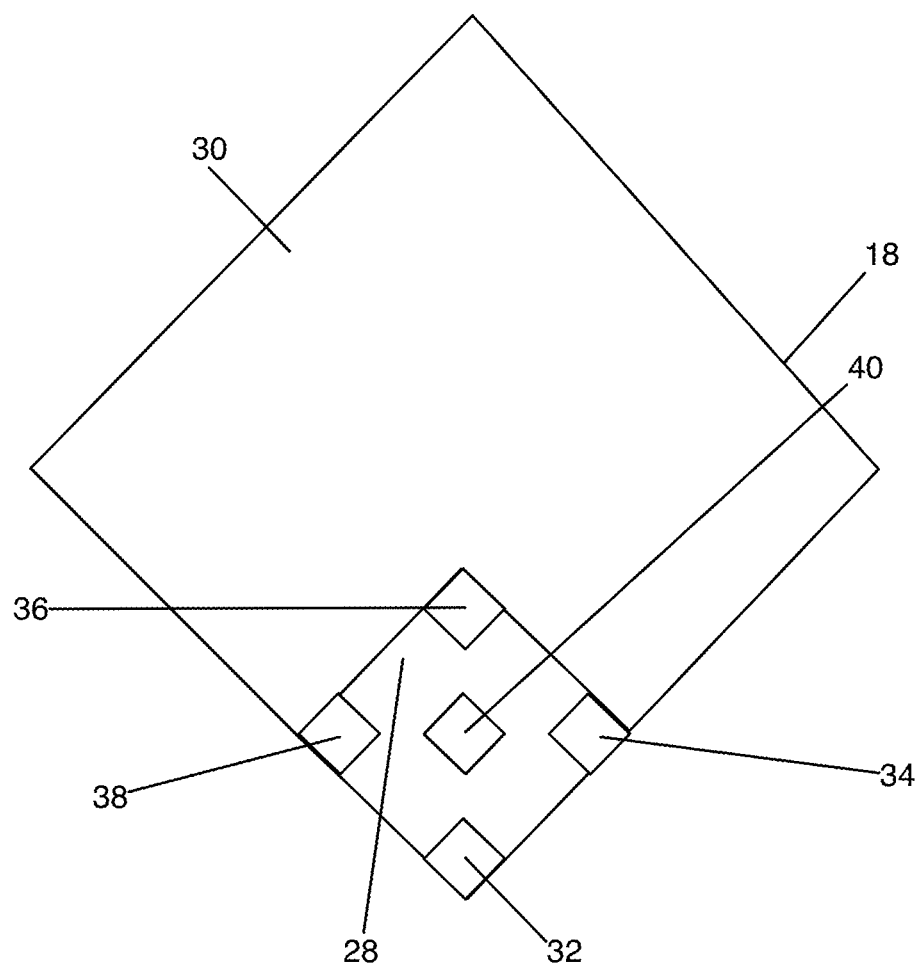
FIG. 4 shows an example embodiment of a baseball field according to the present disclosure.

FIG. 4 shows an example embodiment of a baseball field according to the present disclosure. Some elements of this figure are described above. Thus, same and/or similar reference characters identify identical and/or like components described above and any repetitive detailed description thereof will hereinafter be omitted or simplified in order to avoid complication.

Fields 18, such as field A, field B, and so forth, contain an infield 28 and an outfield 30. Fields 18 can include a foul pole. External to infield 28 and outfield 30, fields 18 can include a foul ball area past a foul line, a dugout, a bullpen, a scoreboard area, and so forth. Infield 28 includes a catcher base 32, a first base 34, a second base 36, and a third base 38. Infield 28 also includes a pitching area 40, which can include a pitching mound.

Figure 5:
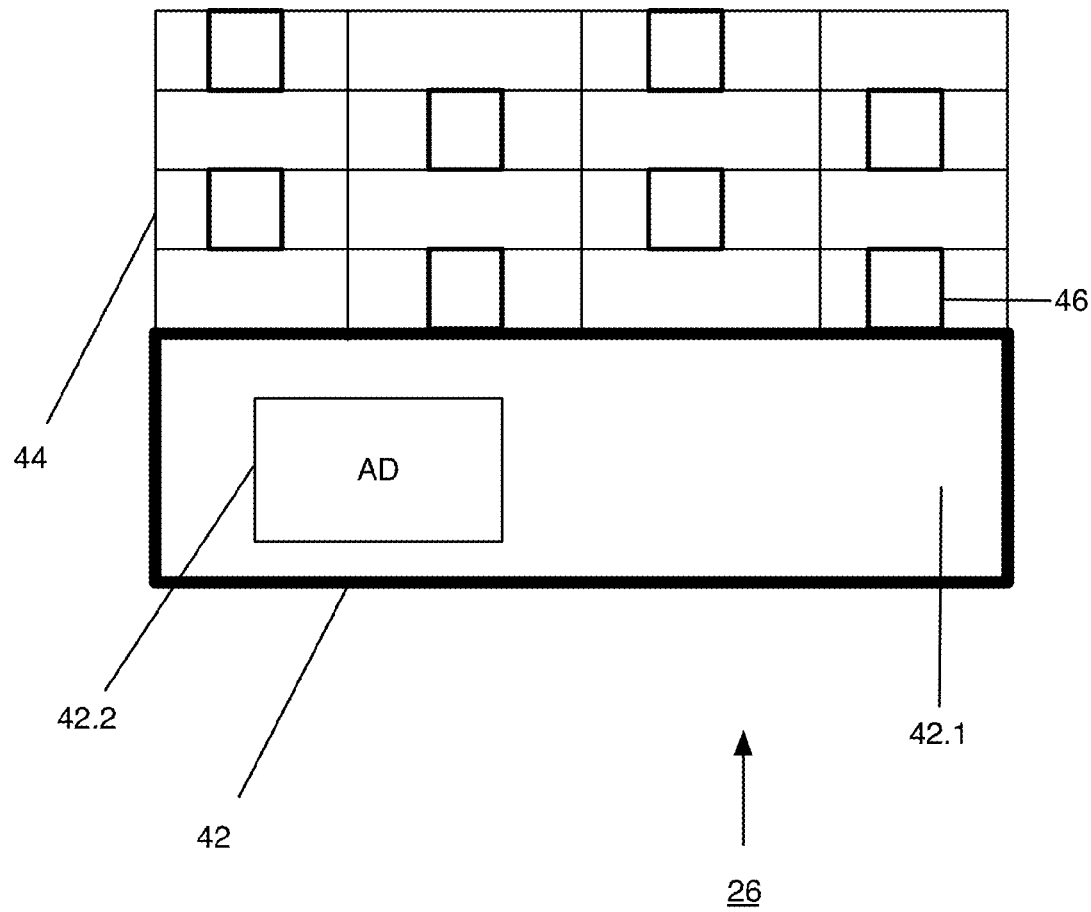
FIG. 5 shows an example embodiment of a baseball field barrier according to the present disclosure.

FIG. 5 shows an example embodiment of a baseball field barrier according to the present disclosure. Some elements of this figure are described above. Thus, same and/or similar reference characters identify identical and/or like components described above and any repetitive detailed description thereof will hereinafter be omitted or simplified in order to avoid complication.

Barrier 26 includes a lower portion 42 and an upper portion 44. Portion 42 includes a solid wall 42.1 containing an advertising display 44.2. Portion 42 can be perforated. Portion 44 is perforated. Portion 44 can be solid, such as a solid wall. In other embodiments, portion 44 can be lacking.

Barrier 26 includes a plurality of sensors 46 installed onto portion 44. Portion 44 can include any amount of sensors 46. Also, note that portion 42 can include any amount of sensors 46. Further, note that at least one of sensors 46 can be positioned within at least one of infield 28 and outfield 30, such as between bases 32, 34, 36, 38, and/or in pitching area 40, spread out in infield 28, spread out in outfield 30, worn by at least one player during baseball gameplay, and so forth. Moreover, note that at least one of sensors 46 can be positioned outside of infield 28 and outfield 30, such as past a foul line, in a spectator area, in a dugout, and so forth. Stated differently, at least one of sensors 46 can be strategically positioned about field 18 in any manner to optimize sensing. At least one of sensors 46 is selectively removable, such as for repair, replacement, and so forth. Note that any of sensors 46 are sufficiently durable for baseball gameplay. For example, at least one of sensors 46 is configured to withstand heat, rain, snow, ice, wind, ball impact, player impact, shock, vibration, and so forth.

At least one of sensors 46 is a pitch sensor. Such sensor 46 is configured to obtain pitch information of a ball, such as a baseball, a softball, a tennis ball, and so forth, pitched from area 40 toward base 32. The ball is pitched via at least one of a manual manner, such as via a pitcher, and an automatic manner, such as via a pitching machine. The pitch information can include at least one of a pitch initiation, pitch conclusion, pitch start time, pitch end time, pitch duration, pitch speed, pitch spin, pitch angle, pitch direction, pitch distance, pitch altitude, pitch trajectory, pitch type, pitch target, and any other relevant information obtainable based on sensing the pitch of the ball. Such sensor 46 is in communication with at least one of computer 14 and computer 16. Such communication can be at least one of direct and indirect. Also, such communication can be at least one of encrypted and unencrypted. Further, such communication can be at least one of wired and wireless. Also, such communication can be at least one of in real-time and not in real-time. At least one of computer 14 and 16 receives, in real-time, the pitch information from such sensor 46. Such sensor 46 can include a processor, a memory coupled to the processor, a communicator, such as an antenna, a network card, and so forth, and sensing hardware coupled to the processor. The sensing hardware obtains the pitch information via at least one of a radar based technology, a camera based technology, a microphone based technology, a ball position tracking technology, an air pressure based technology, a ball contact based technology, a piezoelectric based technology, and any other relevant pitch sensing technology. Such sensor 46 can be powered via a battery, which can be at least one of internal and external to sensor 46. Also, such sensor 46 can be powered via a renewable energy source, such as a solar cell, a wind turbine, a water turbine, and so forth. Further, such sensor 46 can be powered via mains electricity.

At least one of sensors 46 is a hit sensor. Such sensor 46 is configured to obtain hit information of a ball, such as a baseball, a softball, a tennis ball, and so forth, hit from near base 32. The ball is hit via a batter. The hit information can include at least one of a hit initiation, hit conclusion, hit start time, hit end time, hit duration, hit speed, hit momentum, hit spin, hit angle, hit direction, hit distance, hit altitude, hit trajectory, hit type, hit target, hit position, and any other relevant information obtainable based on sensing the hit of the ball. Such sensor 46 is in communication with at least one of computer 14 and computer 16. Such communication can be at least one of direct and indirect. Also, such communication can be at least one of encrypted and unencrypted. Further, such communication can be at least one of wired and wireless. Also, such communication can be at least one of in real-time and not in real-time. At least one of computer 14 and 16 receives, in real-time, the hit information from such sensor 46. Such sensor 46 can include a processor, a memory coupled to the processor, a communicator, such as an antenna, a network card, and so forth, and sensing hardware coupled to the processor. The sensing hardware obtains the hit information via at least one of a radar based technology, a camera based technology, a microphone based technology, a ball position tracking technology, an air pressure based technology, a ball contact based technology, a piezoelectric based technology, and any other relevant hit sensing technology. Such sensor 46 can be powered via a battery, which can be at least one of internal and external to sensor 46. Also, such sensor 46 can be powered via a renewable energy source, such as a solar cell, a wind turbine, a water turbine, and so forth. Further, such sensor 46 can be powered via mains electricity.

At least one of sensors 46 is a ball fielding sensor. Such sensor 46 is configured to obtain ball fielding information of a ball, such as a baseball, a softball, a tennis ball, and so forth, in play after being hit from near base 32. Such fielding can include at least one of ground ball gameplay, fly ball gameplay, and so forth. The ball is hit via a batter. The fielding information can include at least one of fielding duration, fielding speed, fielding momentum, fielding spin, fielding angle, fielding direction, fielding distance, fielding altitude, fielding trajectory, fielding type, fielding target, fielding position, fielding impact, and any other relevant information obtainable based on sensing the fielding of the ball. Such sensor 46 is in communication with at least one of computer 14 and computer 16. Such communication can be at least one of direct and indirect. Also, such communication can be at least one of encrypted and unencrypted. Further, such communication can be at least one of wired and wireless. Also, such communication can be at least one of in real-time and not in real-time. Also, such communication can be at least one of in real-time and not in real-time. At least one of computer 14 and 16 receives, in real-time, the fielding information from such sensor 46. Such sensor 46 can include a processor, a memory coupled to the processor, a communicator, such as an antenna, a network card, and so forth, and sensing hardware coupled to the processor. The sensing hardware obtains the fielding information via at least one of a radar based technology, a camera based technology, a microphone based technology, a ball position tracking technology, an air pressure based technology, a ball contact based technology, a piezoelectric based technology, and any other relevant fielding sensing technology. Such sensor 46 can be powered via a battery, which can be at least one of internal and external to sensor 46. Also, such sensor 46 can be powered via a renewable energy source, such as a solar cell, a wind turbine, a water turbine, and so forth. Further, such sensor 46 can be powered via mains electricity. In some embodiments, such sensor 46 includes sensing technology similar to how hockey pucks are tracked during hockey gameplay. For example, a ball is equipped with a circuit board with a battery. The board includes a shock sensor and an infrared emitter. The ball emits infrared pulses for detection via such sensor 46, which can include a pulse detector and an infrared camera. The camera shutters based on the pulses. The camera transmits ball coordinates to another computer for tracking, whether remote or local to fields 18.

In other embodiments, at least one of sensors 46 can obtain information of more than one type. For example, at least one of sensors 46 can obtain pitch information and fielding information. Further for example, at least one of sensors 46 can obtain hit information and fielding information.

Figure 6:
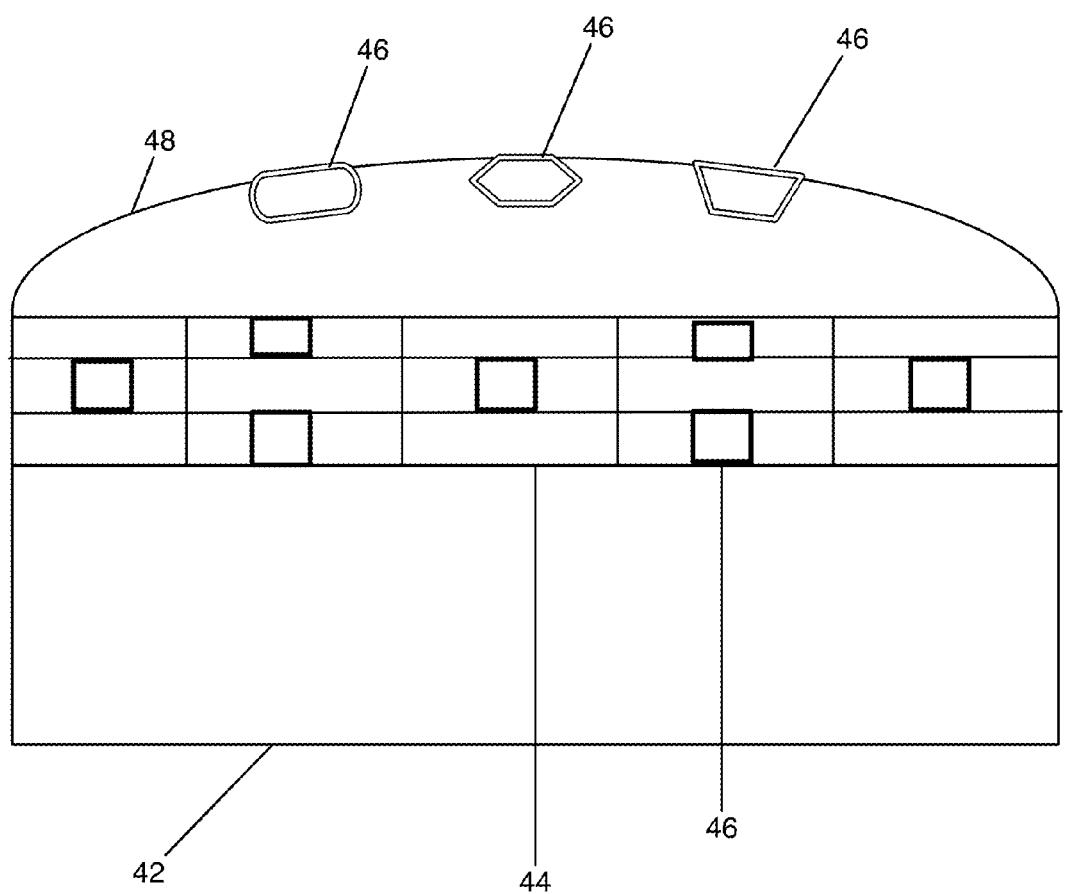
FIG. 6 shows an example embodiment of a covering structure of a baseball field according to the present disclosure.

FIG. 6 shows an example embodiment of a covering structure of a baseball field according to the present disclosure. Some elements of this figure are described above. Thus, same and/or similar reference characters identify identical and/or like components described above and any repetitive detailed description thereof will hereinafter be omitted or simplified in order to avoid complication.

A covering structure 48 extends from portion 44. In other embodiments, structure 50 extends from portion 42. Structure 48 can include a roof, a net, a mesh, a dome, and so forth. Structure 48 can be waterproof. Structure 48 can be solid or perforated. In other embodiments, barrier 26 lacks at least one of portion 42, portion 44, and structure 48. Structure 48 includes sensors 46. In other embodiments, structure 48 lacks sensors 46. Note that sensors 46 can be of different sensing types, such as leftmost sensor 46 on structure 48 is a camera based sensor, intermediate sensor 46 on structure 48 is a radar based sensor, rightmost sensor 46 on structure 48 is a signal tracking sensor, and sensor 46 on portion 44 are contact sensors.

Figure 7:
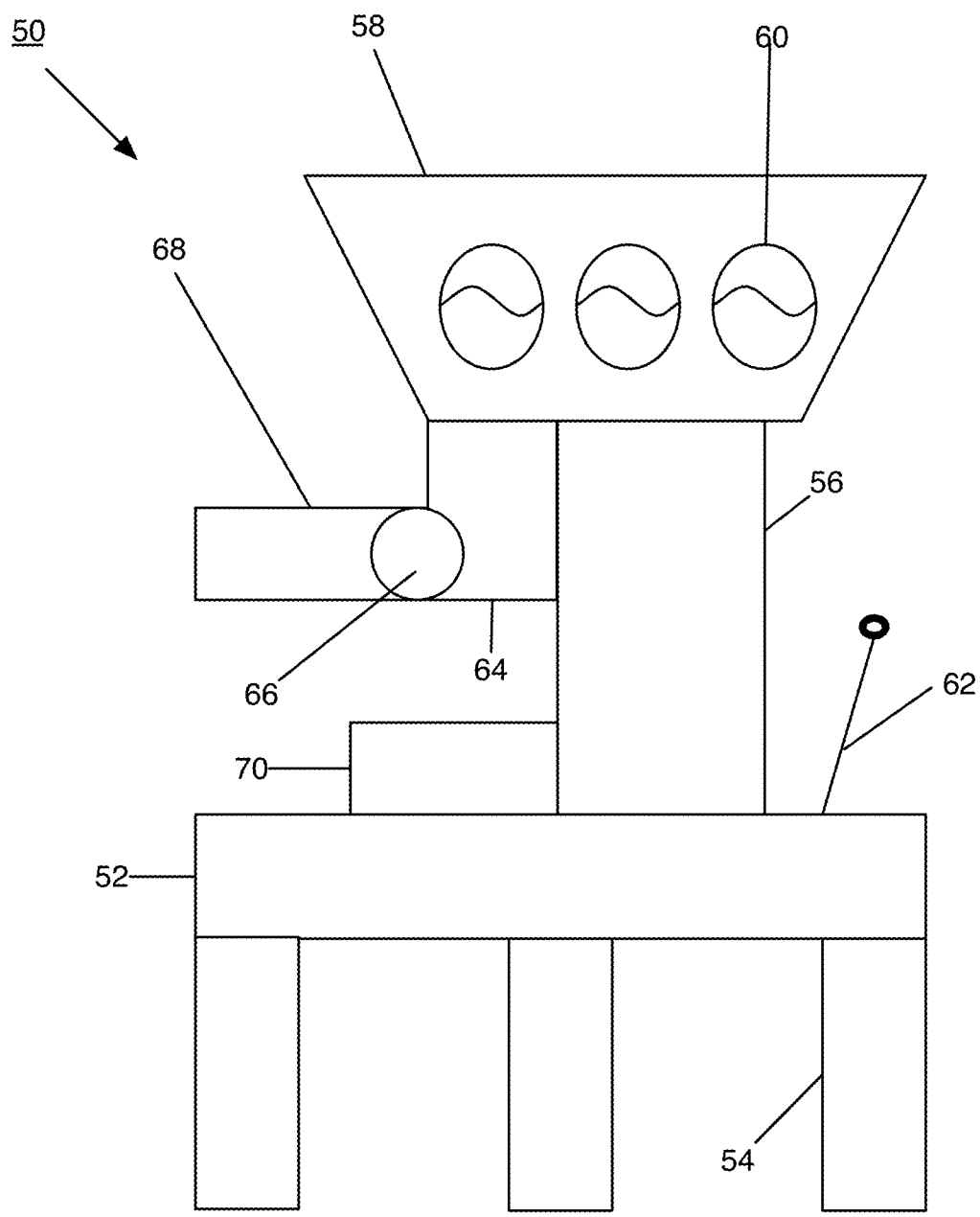
FIG. 7 shows an example embodiment of a pitching machine according to the present disclosure.

FIG. 7 shows an example embodiment of a pitching machine according to the present disclosure. Some elements of this figure are described above. Thus, same and/or similar reference characters identify identical and/or like components described above and any repetitive detailed description thereof will hereinafter be omitted or simplified in order to avoid complication.

A pitching machine 50 is positioned in one of fields 18, such as within area 40 of field A. Machine 50 can be powered via a battery, which can be at least one of internal and external to machine 50. Also, machine 50 can be powered via a renewable energy source, such as a solar cell, a wind turbine, a water turbine, and so forth. Further, machine 50 can be powered via mains electricity.

Machine 50 includes a base 52 standing on a plurality of legs 54, which can be mobile, such as via a wheel, a sphere, and so forth. Machine 50 can include a motor to provide for such mobility, such as at least one of individually and collectively driving a wheel, a sphere, and so forth. Such mobility can be provided via the motor. Machine 50 also includes a tower 56 rising from base 52. A basket 58 is coupled to tower 56, at a peak of tower 56. Basket 58 contains a plurality of balls 60, such as a hardball, a softball, a tennis ball, and so forth. Balls 60 are pitched via propulsion by machine 50 toward base 32. A ball guiding channel 64 extends from basket 58. Channel 64 is used to guide balls 60 from basket 58 for subsequent pitching. A cannon 68 is coupled to channel 64. Cannon 68 is used to pitch balls 60 via propelling balls 60 therefrom. Cannon 68 is vertically adjustable via a pivoting mechanism 66. Cannon 68 is also horizontally adjustable. Machine 50 also includes an antenna 62 for wireless communication with at least one of computer 14 and computer 16, such as in a manner including at least one of encrypted, unencrypted, direct, indirect, real-time, not in real-time, and so forth. Alternatively, machine 50 communicates with at least one of computer 14 and computer 16 via a wire, such as in a manner including at least one of encrypted, unencrypted, direct, indirect, real-time, not in real-time, and so forth. A pitch sensor 70 is stationed on base 52 adjacent to tower 56 below cannon 60. Sensor 70, which faces a batter to whom balls 60 are pitched, can sense pitch information similarly to at least one of sensors 46.

Figure 8:
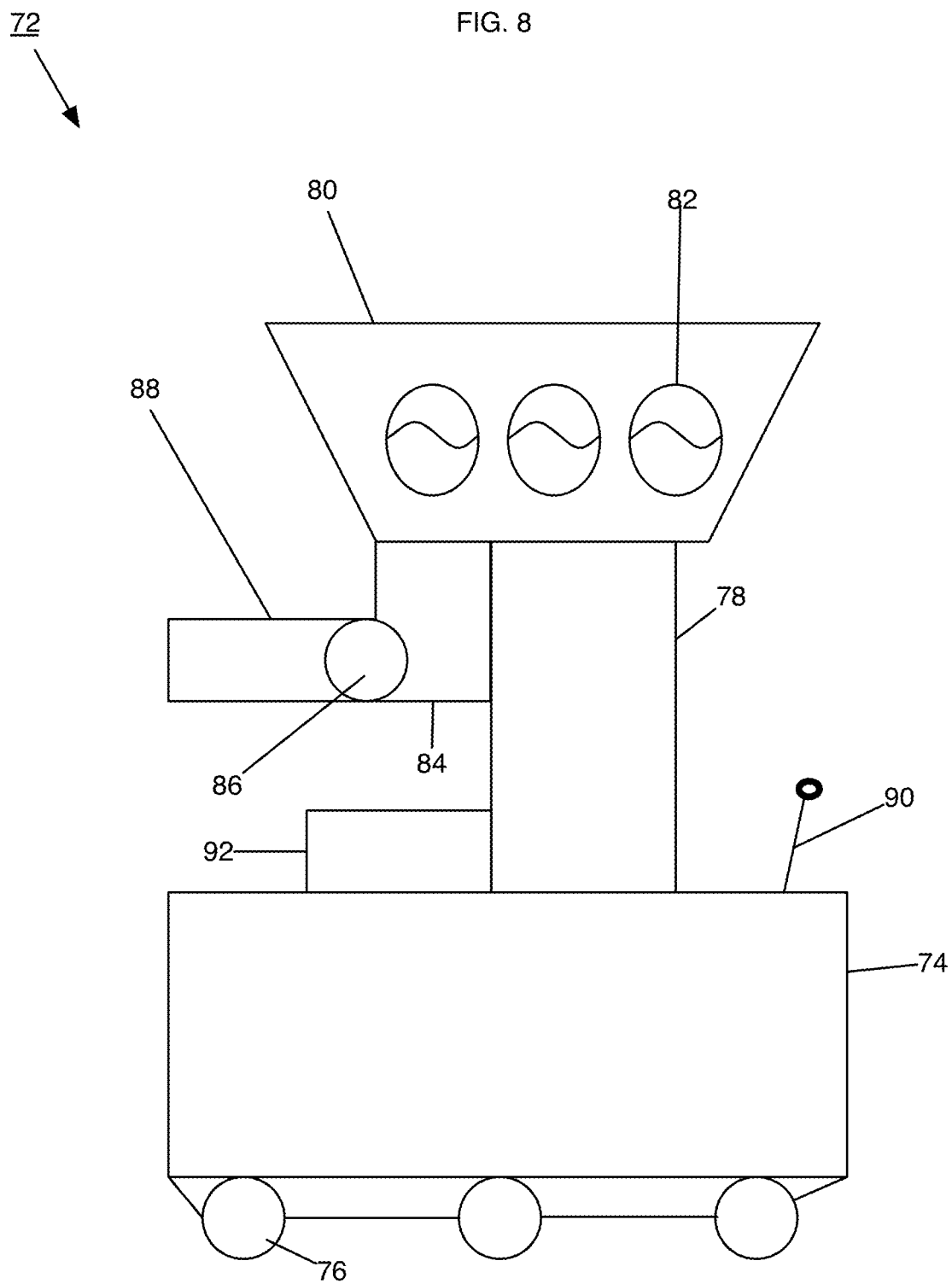
FIG. 8 shows an example embodiment of a fielding machine according to the present disclosure.

FIG. 8 shows an example embodiment of a fielding machine according to the present disclosure. Some elements of this figure are described above. Thus, same and/or similar reference characters identify identical and/or like components described above and any repetitive detailed description thereof will hereinafter be omitted or simplified in order to avoid complication.

A fielding machine 72 is positioned in one of fields 18, such as proximal to base 32 of field A. Machine 72 can be powered via a battery, which can be at least one of internal and external to machine 50. Also, machine 72 can be powered via a renewable energy source, such as a solar cell, a wind turbine, a water turbine, and so forth. Further, machine 72 can be powered via mains electricity.

Machine 72 includes a base 74 resting on a plurality of wheels 76, which can be driven via at least one of individually and collectively. Alternatively, base 74 can stand on a plurality of legs, such as legs 54. Wheel 76 can be a sphere. Machine 72 also includes a tower 78 rising from base 74. A basket 80 is coupled to tower 78, at a peak of tower 78. Basket 80 contains a plurality of balls 82, such as a hardball, a softball, a tennis ball, and so forth. Balls 82 are fielded via propulsion by machine 72 toward at least one of infield 28 and outfield 30. A ball guiding channel 84 extends from basket 80. Channel 84 is used to guide balls 82 from basket 80 for subsequent fielding. A cannon 88 is coupled to channel 84. Cannon 88 is used to field balls 82 via propelling balls 82 therefrom. Cannon 88 is vertically adjustable via a pivoting mechanism 86. Cannon 88 is also horizontally adjustable. Machine 72 also includes an antenna 90 for wireless communication with at least one of computer 14 and computer 16, such as in a manner including at least one of encrypted, unencrypted, direct, indirect, real-time, not in real-time, and so forth. Alternatively, machine 72 communicates with at least one of computer 14 and computer 16 via a wire, such as in a manner including at least one of encrypted, unencrypted, direct, indirect, real-time, not in real-time, and so forth. A fielding sensor 92 is stationed on base 74 adjacent to tower 78 below cannon 88. Sensor 92, which faces a pitcher, can sense fielding information similarly to at least one of sensors 46.

Figure 9:
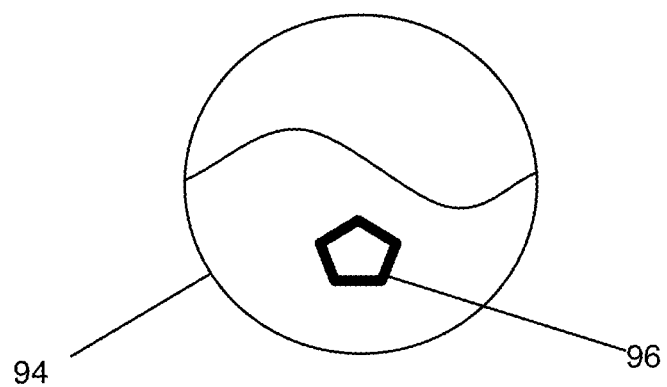
FIG. 9 shows an example embodiment of a ball according to the present disclosure.

FIG. 9 shows an example embodiment of a ball according to the present disclosure. Some elements of this figure are described above. Thus, same and/or similar reference characters identify identical and/or like components described above and any repetitive detailed description thereof will hereinafter be omitted or simplified in order to avoid complication.

A ball 94 can be a baseball, a softball, a tennis ball, and so forth. Ball 94 is equipped with characteristic hardware 96 configured to determine at least one of a flight characteristic of ball 94 and impact characteristic of ball 94, at least within fields 18. The flight characteristic is based on ball 94 being in flight, such as via pitching ball 94, hitting ball 94, throwing ball 94, and so forth. The flight characteristic can include information relating to ball in flight, such as speed, direction, duration, distance, target, spin, trajectory, altitude, and any other relevant ball flight information. The impact characteristic is based on batting and wall/ground impact. The impact characteristic can include force of impact, location of impact, speed of impact, angle of impact, and any other relevant ball impact information. Note that at least one of the flight characteristic and the impact characteristic can be obtained via at least one of hardware 96 on its own and hardware 96 communicating with other sensors, trackers, computers, measuring devices, and so forth, which can be in field 18, off field 18, and so forth.

Hardware 96 can include a processor, a memory coupled to the processor, a communicator, such as an antenna, coupled to the processor, and a characteristic determinator, such as an accelerometer, a compass, a gyroscope, an impact sensor, a contact sensor, a positioning tracker, and so forth, coupled to the processor. Hardware 96 can communicate, in real-time, via the communicator, with at least one of computer 14 and computer 16. Such communication can be in a manner including at least one of encrypted, unencrypted, direct, indirect, real-time, not in real-time, and so forth. Such communication can include ball characteristic information indicative of the characteristic of baseball 94 within field 18, such as the flight characteristic and the impact characteristic. Hardware 96 can be powered via a battery, such as a battery within ball 94, a renewable energy source, such as a solar cell on ball 94, and so forth. Hardware 96 can be selectively removable, such as for repair, replacement, and so forth.

Figure 10:
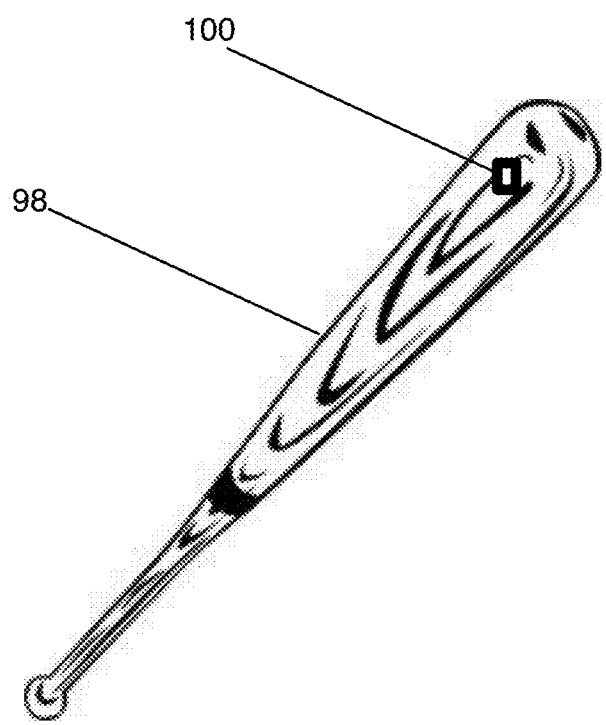
FIG. 10 shows an example embodiment of a bat according to the present disclosure.

FIG. 10 shows an example embodiment of a bat according to the present disclosure. Some elements of this figure are described above. Thus, same and/or similar reference characters identify identical and/or like components described above and any repetitive detailed description thereof will hereinafter be omitted or simplified in order to avoid complication.

A bat 98 can include at least one of wood, rubber, plastic, metal, and so forth. Bat 98 includes hardware 100 configured to determine a hit of a ball via bat 100. The hit can be determined via an impact sensor, a pressure sensor, and so forth, which can be at least one of internal to bat 98 and external to bat 98. Hardware 100 can determine information relating to the hit, such as force of impact, location of impact, speed of impact, angle of impact, duration of impact, and any other relevant ball hit information. Note that the hit information can be obtained via at least one of hardware 100 on its own and hardware 100 communicating with other sensors, trackers, computers, measuring devices, and so forth, which can be in field 18, off field 18, and so forth.

Hardware 100 can include a processor, a memory coupled to the processor, a communicator, such as an antenna, coupled to the processor, and a hit determinator, such as an accelerometer, a pressure sensor, a gyroscope, an impact sensor, and so forth, coupled to the processor. Hardware 100 can communicate, in real-time, via the communicator, with at least one of computer 14 and computer 16. Such communication can be in a manner including at least one of encrypted, unencrypted, direct, indirect, real-time, not in real-time, and so forth. Such communication can include the hit information indicative of the hit of a ball via bat 98 at least within field 18. Hardware 100 can be powered via a battery, such as a battery within bat 98, a renewable energy source, such as a solar cell on bat 98, and so forth. Hardware 100 can be selectively removable, such as for repair, replacement, and so forth.

Figure 11:
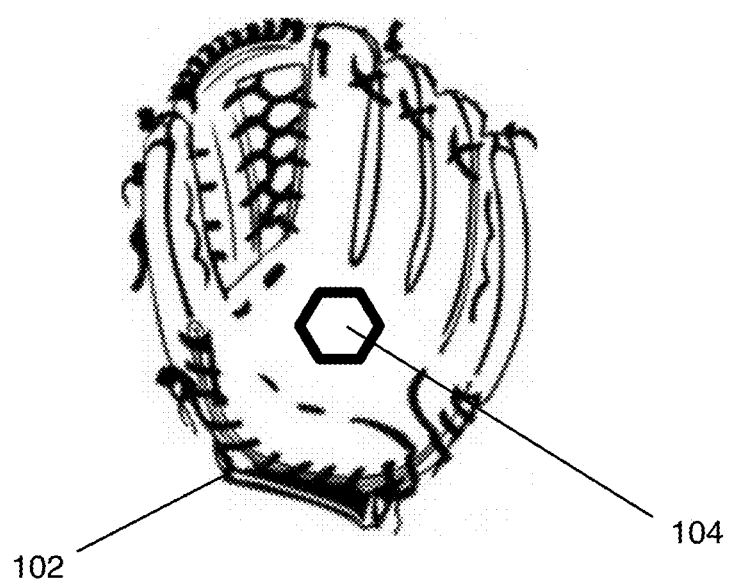
FIG. 11 shows an example embodiment of a glove according to the present disclosure.

FIG. 11 shows an example embodiment of a glove according to the present disclosure. Some elements of this figure are described above. Thus, same and/or similar reference characters identify identical and/or like components described above and any repetitive detailed description thereof will hereinafter be omitted or simplified in order to avoid complication.

A glove 102 can include leather. Glove 102 includes hardware 104 configured to determine a catch of a ball via glove 102. Glove 102 includes a palm portion and a plurality of finger portions. Hardware 104 can be located in the palm portion. Hardware 104 can be located in at least one of the finger portions. The catch can be determined via an impact sensor, a pressure sensor, and so forth, which can be at least one of internal to glove 102 and external to glove 102. Hardware 104 can determine information relating to the catch, such as force of impact, speed of impact, angle of impact, and any other relevant ball catch information. Note that the catch information can be obtained via at least one of hardware 104 on its own and hardware 104 communicating with other sensors, trackers, computers, measuring devices, and so forth, which can be in field 18, off field 18, and so forth.

Hardware 104 can include a processor, a memory coupled to the processor, a communicator, such as an antenna, coupled to the processor, and a catch determinator, such as a pressure sensor, an impact sensor, and so forth, coupled to the processor. Hardware 104 can communicate, in real-time, via the communicator, with at least one of computer 14 and computer 16. Such communication can be in a manner including at least one of encrypted, unencrypted, direct, indirect, real-time, not in real-time, and so forth. Such communication can include the catch information indicative of the catch of a ball via bat glove 102 at least within field 18. Hardware 104 can be powered via a battery, such as a battery within glove 102, a renewable energy source, such as a solar cell on glove 102, and so forth. Hardware 104 can be selectively removable, such as for repair, replacement, and so forth.

Figure 12:
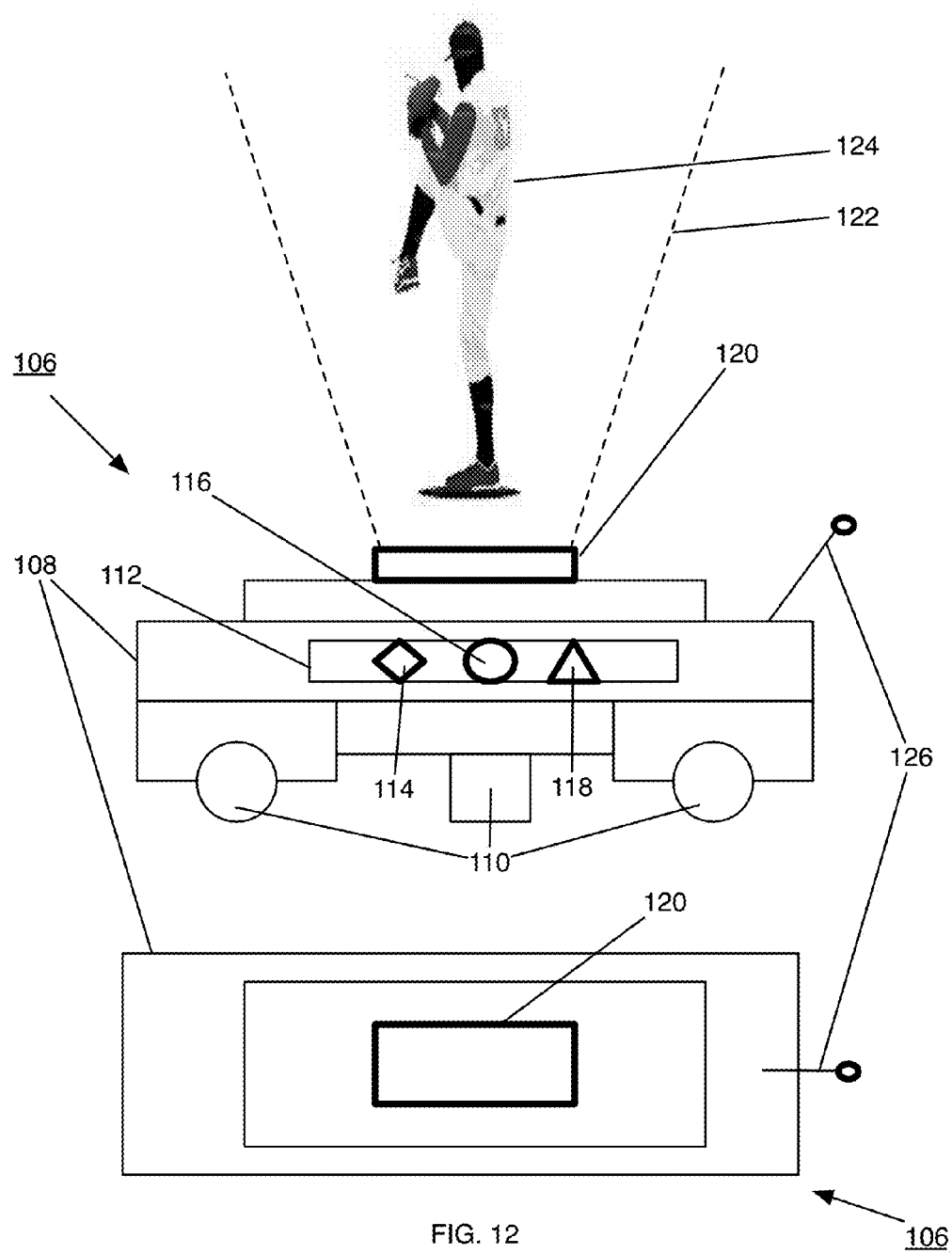
FIG. 12 shows an example embodiment of an artificial representation machine according to the present disclosure.

FIG. 12 shows an example embodiment of an artificial representation machine according to the present disclosure. Some elements of this figure are described above. Thus, same and/or similar reference characters identify identical and/or like components described above and any repetitive detailed description thereof will hereinafter be omitted or simplified in order to avoid complication.

An artificial representation machine 106 is configured for use at least in fields 18, such as within field A in at least one of infield 28 and outfield 30. Machine 106 includes a base 108. Machine 106 includes a motor, which is internal to base 108. Alternatively, the motor is external to base 108. Base 108 includes a plurality of wheels 110, which are driven by the motor, such as via at least one of individually and collectively. Alternatively, at least one of wheels 110 is spherical. The motor is sufficiently powerful to drive machine 106 via wheels 110 on at least one of fields 18 to mimic a field position of a player playing in a fielding position on at least one of fields 18. Such field position can be anywhere in at least one of infield 28 and outfield 30. The fielding position can include any infield and outfield position, such as a short-stop player, a catcher, a pitcher, a center fielder, a second baseman, and so forth. For example, the motor is configured for rapid acceleration, continuous movement at a certain speed, sudden changes of movements, sudden stops, and so forth. Also for example, the rapid acceleration can be from about 0 to about 10 miles per hour (mph) in about 3 seconds.

Base 108 includes a power source, such as a battery, which can be at least one of selectively rechargeable, replaceable, and removable. The power source is rechargeable via at least one of mains electricity and renewable energy, such as a solar cell on base 108. The motor is powered by the power source. The power source is internal to base 108. Alternatively, the power source is external to base 108.

Machine 106 includes a processor, a memory coupled to the processor, and a data communicator, such as an antenna 126, coupled to the processor. At least one of the processor and the memory are internal to base 108. Alternatively, at least one of the processor and the memory are external to base 108. The data communicator is external to base 108. Alternatively, the data communicator is internal to base 108. The data communicator is configured to communicate with at least one of computer 14 and computer 16. Such communication can be in a manner including at least one of encrypted, unencrypted, direct, indirect, real-time, not in real-time, and so forth.

Base 108 includes a side port section 112, which includes a port 114 and a port 118. Port 114 is used for recharging the power source, such as the battery. The recharging can be based on at least one of alternating current (AC) and direct current (DC). Port 118 is used for data communication, such as at least one of data input and data output involving at least one of the processor and the memory. Note that port 114 and port 118 can be combined into a single port for at least dual functionality, such as a Universal Serial Bus (USB) port. Alternatively, at least one of port 114 and port 118 is lacking and recharging is performed wirelessly, such as via induction, and data communication is performed wirelessly, such as via a wireless communication protocol, such as TCP/IP. Such communication can be in a manner including at least one of encrypted, unencrypted, direct, indirect, real-time, not in real-time, and so forth. Such communication include software reprogramming, software updates, field position data, and so forth.

Section 112 includes a field positioning sensor 116 configured to facilitate in orientation of machine 106 on fields 18. For example sensor 116 is radar based, which allow for machine 106 to travel on fields 18 based on radar information obtained via sensor 116. Note that sensor 116 can utilize any type of field positioning technology, such as camera based, laser based, sound wave based, and so forth. Sensor 116 is in communication with the processor.

Machine 106 includes a holographic beam output device 120, which is powered by the power source. Device 120 is positioned above base 108, although other positions are possible as well. Device 120 is configured to output a holographic beam 122 containing a holographic entity 124 therein. Entity 124 can be grayscale, colorful, and so forth. Entity 124 can be any size, shape, height, depth, and so forth. Entity 124 is visible from multiple viewpoints around entity 124, such as frontal, rear, sideways, diagonal, and so forth. Entity 124 is any player fielding at least one of fields 18, such as a pitcher, a catcher, an infielder, and an outfielder. Entity 124 mimics, in real-time, a fielding movement of a player in the other of fields 18, such as field B. The fielding movement can include standing, running, catching, throwing, facial expressions, body expressions, and so forth. The mimicking is based on data received via the data communicator, such as antenna 126, from at least one of computer 14 and computer 16. The fielding movement is obtained via sensors 46, a camera local to the player, and so forth. Therefore, as one player moves, while performing the fielding movement, within one of fields 18, machine 106 mimics the player in the other one of fields 18 and correspondingly moves in the other one of fields 18, while entity 122 correspondingly mimics the fielding movement of the player.

In some example embodiments, a mannequin is used, whether at least one of alternatively, additionally, and supplementary, to provide artificial representation functionality. Note that the mannequin can include device 120 for enhancing realistic appearance functionality. The mannequin can be human shaped/sized, such as entity 122. The mannequin can be a humanoid, such as entity 122. The mannequin is configured for use at least in fields 18, such as within field A in at least one of infield 28 and outfield 30. The mannequin includes a motor. The mannequin can include a plurality of wheels, which are driven by the motor, such as via at least one of individually and collectively. Alternatively, at least one of wheels is spherical. The motor is sufficiently powerful to move the mannequin on at least one of fields 18 to mimic a field position of a player playing in a fielding position on at least one of fields 18. Such field position can be anywhere in at least one of infield 28 and outfield 30. The fielding position can include any infield and outfield position, such as a short-stop player, a catcher, a pitcher, a center fielder, a second baseman, and so forth. For example, the motor is configured for rapid acceleration, continuous movement at a certain speed, sudden changes of movements, sudden stops, and so forth. Also for example, the rapid acceleration can be from about 0 to about 10 miles per hour (mph) in about 3 seconds.

The mannequin includes a power source, such as a battery, which can be at least one of selectively rechargeable, replaceable, and removable. The power source is rechargeable via at least one of mains electricity and renewable energy, such as a solar cell on the mannequin. The motor is powered by the power source. The power source is internal to the mannequin. Alternatively, the power source is external to the mannequin.

The mannequin includes a processor, a memory coupled to the processor, and a data communicator, such as antenna 126, coupled to the processor. At least one of the processor and the memory are internal to the mannequin. Alternatively, at least one of the processor and the memory are external to the mannequin. The data communicator is external to the mannequin. Alternatively, the data communicator is internal to the mannequin. The data communicator is configured to communicate with at least one of computer 14 and computer 16. Such communication can be in a manner including at least one of encrypted, unencrypted, direct, indirect, real-time, not in real-time, and so forth.

The mannequin can include a recharging port for recharging the power source, such as the battery. The recharging can be based on at least one of alternating current (AC) and direct current (DC). The mannequin can include a data port for data communication, such as at least one of data input and data output involving at least one of the processor and the memory. Note that the recharging port and the data port can be combined into a single port for at least dual functionality, such as a USB port. Alternatively, at least one of the recharging port and the data port is lacking and recharging is performed wirelessly, such as via induction, and data communication is performed wirelessly, such as via a wireless communication protocol, such as TCP/IP. Such communication can be in a manner including at least one of encrypted, unencrypted, direct, indirect, real-time, not in real-time, and so forth. Such communication include software reprogramming, software updates, field position data, and so forth.

The mannequin includes a field positioning sensor configured to facilitate in orientation of the mannequin on fields 18. For example, the sensor is radar based, which allow for the mannequin to travel on fields 18 based on radar information obtained via the sensor. Note that the sensor can utilize any type of field positioning technology, such as camera based, laser based, sound wave based, and so forth. The sensor is in communication with the processor.

The mannequin can be grayscale, colorful, and so forth. The mannequin can be any size, shape, height, depth, and so forth. The mannequin is visible from multiple viewpoints around the mannequin, such as frontal, rear, sideways, diagonal, and so forth. The mannequin is any player fielding at least one of fields 18, such as a pitcher, a catcher, an infielder, and an outfielder. The mannequin mimics, in real-time, a fielding movement of a player in the other of fields 18, such as field B. The fielding movement can include standing, running, catching, throwing, facial expressions, body expressions, and so forth. The mimicking is based on data received via the data communicator, such as antenna 126, from at least one of computer 14 and computer 16. The fielding movement is obtained via sensors 46, a camera local to the player, and so forth. Therefore, as one player moves, while performing the fielding movement, within one of fields 18, the mannequin mimics the player in the other one of fields 18 and correspondingly moves in the other one of fields 18, while correspondingly mimicing the fielding movement of the player.

In still other example embodiments, a remote presence robot can be used similarly to at least one of machine 120 and the mannequin, as described herein, whether at least one of supplementary, alternatively, and additionally.

In other example embodiments, at least one of machine 50 and machine 74 includes device 120 for enhancing realistic appearance functionality.

Figure 13:
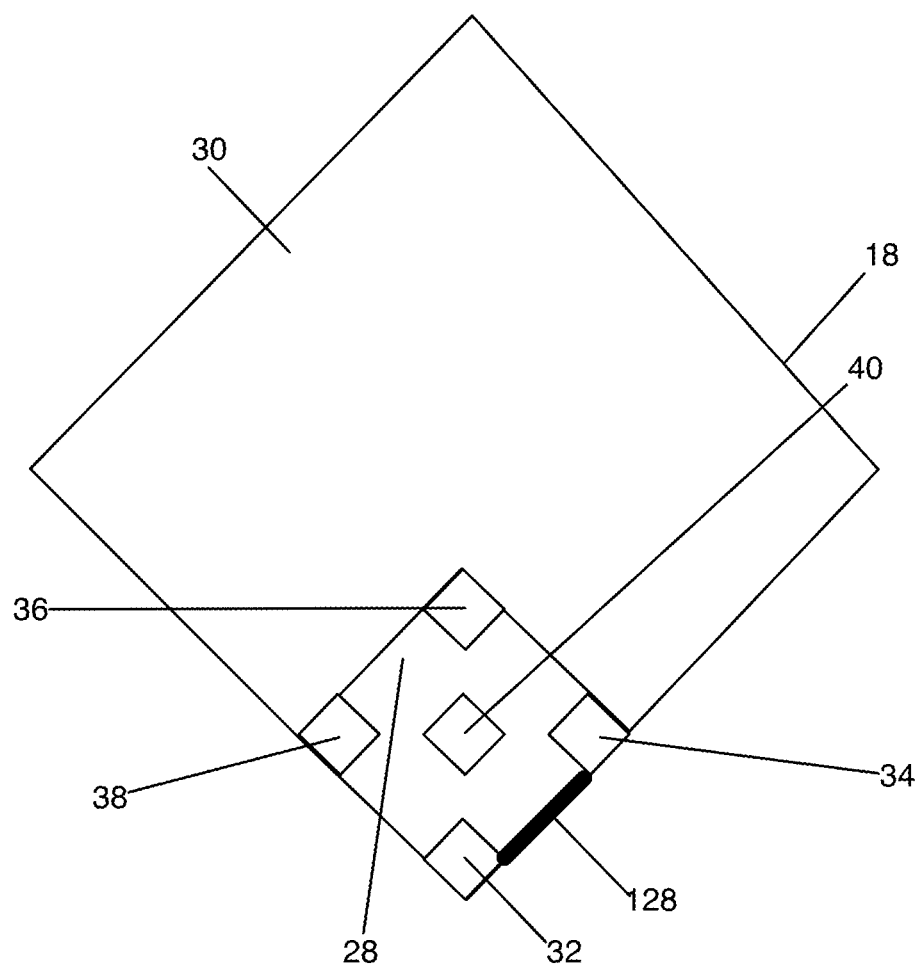
FIG. 13 shows an example embodiment of an illuminated path on a baseball field according to the present disclosure.

FIG. 13 shows an example embodiment of an illuminated path on a baseball field according to the present disclosure. Some elements of this figure are described above. Thus, same and/or similar reference characters identify identical and/or like components described above and any repetitive detailed description thereof will hereinafter be omitted or simplified in order to avoid complication.

At least one of fields 18 includes a path 128 spanning between base 32 and base 34. Path 128 can be waterproof. Path 128 can be continuos, segmented, and so forth. Path 128 is configured to output light sufficiently bright such that the light is visible, in real-time, to a player fielding at least one of fields 18, such as at least one of infield 28 and outfield 30. Path 128 can receive power from mains electricity, a battery, a renewable energy source, such as a solar cell, and so forth. The light can be output in any manner, such as continuos, segmented, and so forth. The light can be of any color. Note that path 128 can also extend between base 34 and base 36. Further, note that path 128 can extend between base 36 and base 38. Additionally, note that path 128 can extend between base 38 and base 32. Moreover, note that such extensions can be continuos, segmented, and so forth. Path 128 can include network communication hardware. Path 128 can communicate, in real-time, via the network communication hardware, with at least one of server 14, server 16, and server 18. Such communication can be in a manner including at least one of encrypted, unencrypted, direct, indirect, real-time, not in real-time, wired, wireless, and so forth.

Figure 14:
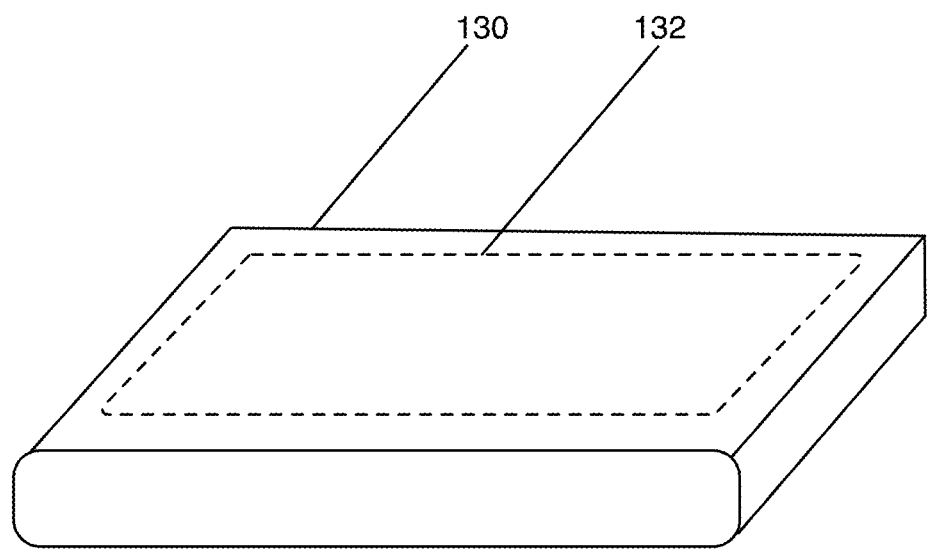
FIG. 14 shows an example embodiment of a base equipped with a base contact sensor according to the present disclosure.

FIG. 14 shows an example embodiment of a base equipped with a base contact sensor according to the present disclosure. Some elements of this figure are described above. Thus, same and/or similar reference characters identify identical and/or like components described above and any repetitive detailed description thereof will hereinafter be omitted or simplified in order to avoid complication.

A base 130 can include at least one of leather, plastic, rubber, metal, wood, and so forth. Base 130 can be waterproof. Base 130 can be secured to at least one of fields 18, such as via a fastener, a magnet, a glue, a hook-and-loop technology, a male-female connector, and so forth. Alternatively, base 130 can rest unsecured on at least one of fields 18. Note that base 130 can rest on a ground surface. Also, base 130 can be flush with the ground surface. Base 130 is sufficiently durable to withstand player impact. Base 130 Base 130 includes hardware 132 configured to determine a player base contact with base 130. Such contact can be determined via an impact sensor, a pressure sensor, and so forth, which can be at least one of internal to base 130 and external to base 130. Hardware 132 can determine information relating to the base contact, such as force of contact, speed of contact, angle of contact, time of contact, and any other relevant base contact information. Note that the contact information can be obtained via at least one of hardware 132 on its own and hardware 132 communicating with other sensors, trackers, computers, measuring devices, and so forth, which can be in field 18, off field 18, and so forth.

Hardware 132 can include a processor, a memory coupled to the processor, a communicator, such as an antenna, coupled to the processor, and a base contact determinator, such as a pressure sensor, an impact sensor, and so forth, coupled to the processor. Hardware 132 can communicate, in real-time, via the communicator, with at least one of computer 14 and computer 16. Such communication can be in a manner including at least one of encrypted, unencrypted, direct, indirect, real-time, not in real-time, and so forth. Such communication can include the base contact information indicative of the contact with base 130 at least within field 18. Hardware 132 can be powered via a battery, such as a battery within base 130, a renewable energy source, such as a solar cell on base 130, and so forth. Hardware 132 can be selectively removable, such as for repair, replacement, and so forth.

Figure 15:
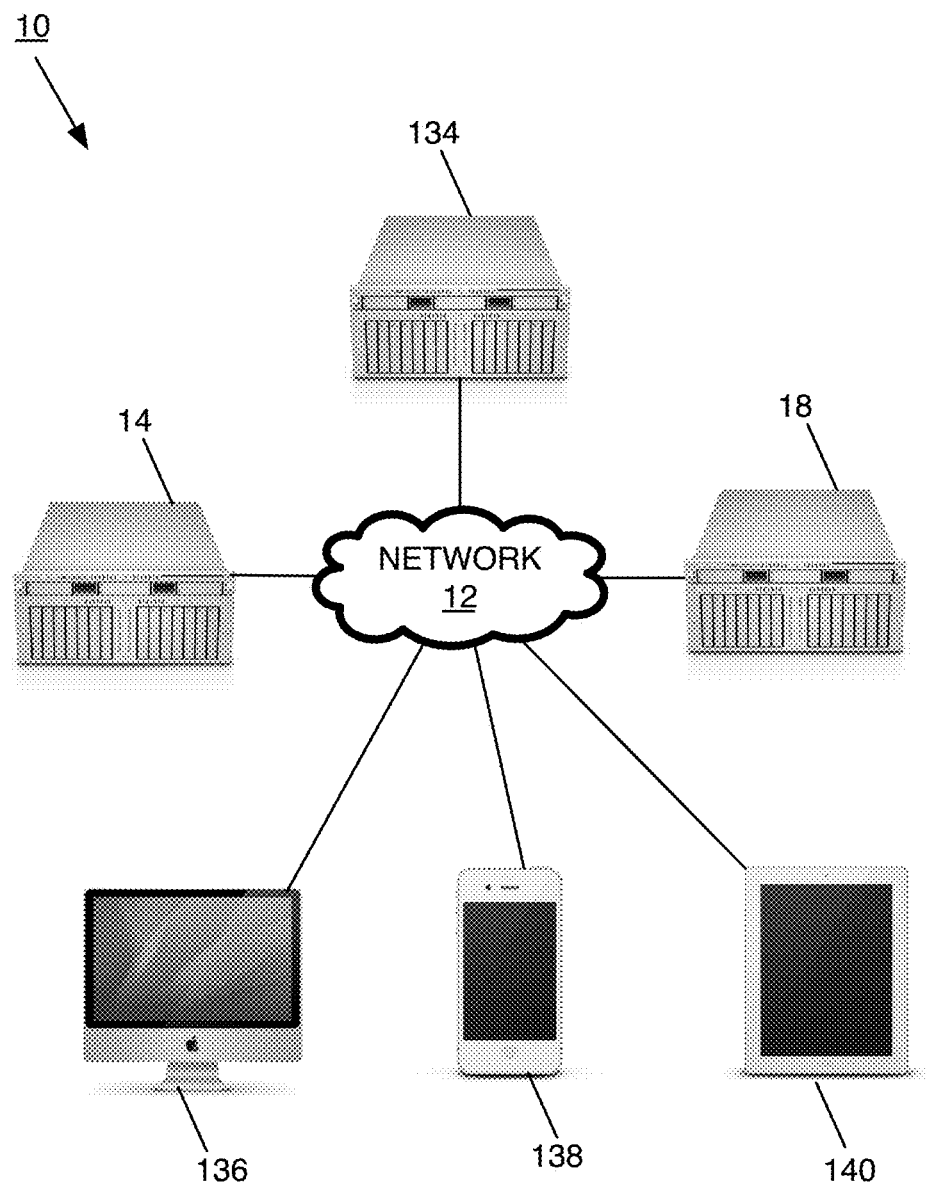
FIG. 15 shows an example embodiment of a network environment with a plurality of end user devices according to the present disclosure.

FIG. 15 shows an example embodiment of a network environment with a plurality of end user devices according to the present disclosure. Some elements of this figure are described above. Thus, same and/or similar reference characters identify identical and/or like components described above and any repetitive detailed description thereof will hereinafter be omitted or simplified in order to avoid complication.

A plurality of computers 134, 136, 138, 140 is in communication with network 12 in any manner. Any of computers 136, 138, 140 can be end user devices. Any of computers 134, 136, 138, 140 can communicate with any of computers 134, 136, 138, 140 in any manner. Further, any of computers 134, 136, 138, 140 can communicate with at least one of computer 14 and computer 16 in any manner, such as for communicating to facilitate real-time gameplay between field A and field B. For example, such communication can be in a manner including at least one of encrypted, unencrypted, direct, indirect, real-time, not in real-time, wired, wireless, over network 12, avoiding network 12, and so forth. Any of computers 134, 136, 138, 140 can be a server, a workstation, a desktop, a tablet, a mobile phone, a supercomputer, and so forth. For example, computer 138 is a mobile phone operated by a game spectator local to at least one of fields 18.

Upon user selection, at least one of computers 134, 136, 138, 140 can play a video game, which is updated, in real-time, based on data received, in real-time, from at least one of computer 14 and computer 16, such as via at least one of computers 136, 138, 140 communicating with computer 134. The video game gameplay is adjusted/updated according to the data, in real-time. For example, in the video game, gameplay statistics can change in real-time. The data includes relevant gameplay information obtained from at least one of fields 18 regarding a ball in play, such as a ball 94, a manually pitched ball, an automatically pitched ball by machine 50, a manually hit ball by bat 98, an automatically fielded ball by fielding machine 72, a manually caught ball by glove 102, and so forth. The video game can include a baseball gameplay simulator. Note that at least one of computers 134, 136, 138, 140 can be a video game console.

During gameplay, at least one of computers 134, 136, 138, 140 can be local to at least one of fields 18, such within at least one of infield 28, outfield 30, a spectator area, a dugout, and so forth. At least one of computers 134, 136, 138, 140 can include at least one of software logic and hardware logic. The software logic includes at least one of a module, an add-on, a program, a mobile app, a browser extension, and so forth. The hardware logic includes at least one of a circuit, a chip, and so forth. At least one of the hardware logic and the software logic is configured to have at least one of computers 134, 136, 138, 140 function as a reference point for ball tracking, in real-time, during gameplay. For example, computer 138 is a mobile phone, which runs a mobile app. The app includes a set of computer-executable instructions allowing the phone to wirelessly communicate with ball 94, which can be a manually pitched ball, an automatically pitched ball, a manually hit ball, an automatically fielded ball, a ball in flight during play, and so forth. Therefore, when a plurality of such mobile phones, such as at least three, communicate with ball 94, then ball 94 can be positionally tracked, such as when stationary and moving, with respect to such mobile phones. Such tracking can be via signal triangulation, multilateration, global positioning system (GPS), and so forth.

Figure 16:
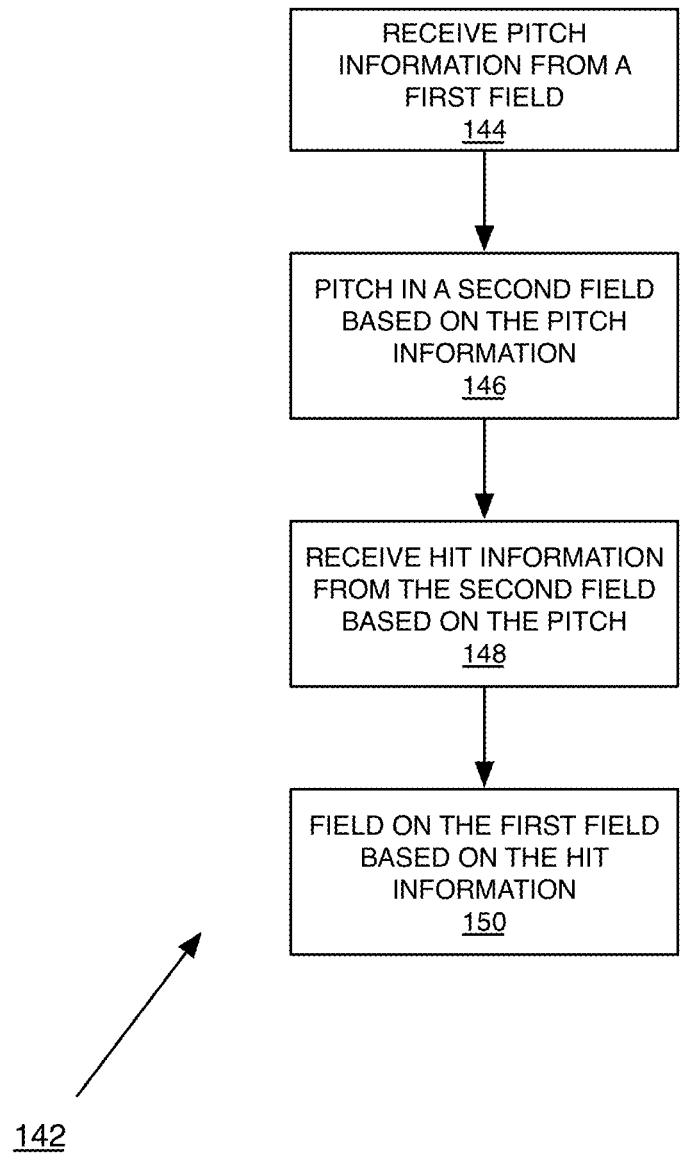
FIG. 16 shows a flowchart of an example embodiment of a process for playing baseball according to the present disclosure.

FIG. 16 shows a flowchart of an example embodiment of a process for playing baseball according to the present disclosure. Some elements of this figure are described above. Thus, same and/or similar reference characters identify identical and/or like components described above and any repetitive detailed description thereof will hereinafter be omitted or simplified in order to avoid complication.

A process 142 is for playing baseball between fields 18, such field A and field B. Process 142 includes a plurality of blocks 144-150, which can be performed by at least one entity. Process 142 is performed in real-time.

Block 140 entails receiving pitch information from a first field. The receiving is via at least one of computer 14 and computer 16, as described herein. The pitch information is as described herein, as sensorily obtained based on a manual pitch. The first field includes at least one of fields 18, such as field A.

Block 142 entails pitching in a second field based on the pitch information. The pitching is via machine 50, as described herein. The second field is at least one of fields 18, such as field B.

Block 144 entails receiving hit information from the second field based on the pitch. The receiving is via at least one of computer 14 and computer 16, as described herein. The hit information is as described herein, as sensorily obtained based on a manual hit.

Block 146 entails fielding on the first field based on the hit information. The fielding is via machine 72, as described herein.

In an example mode of operation, a system includes computer 14 in communication with pitch sensors 46 and fielding machine 72. Computer 14 is associated with field A having first pitching area 40 and first plurality of bases 32, 34, 36, 38 including first catcher base 32. Field A has pitch sensors 46 arranged thereabout. Fielding machine 72 is proximal to first catcher base 32. The system also includes computer 16 in communication with pitching machine 50 hit sensors 46. Computer 16 is associated with field B having second pitching area 40 and second plurality of bases 32, 34, 36, 38 including second catcher base 32. Second area 40 has pitching machine 50. Field B has hit sensors 46 arranged thereabout. Sensors 46 obtain pitch information of a first ball as manually pitched from first area 40 toward first catcher base 32. Computer 14 receives, in real-time, the pitch information from pitch sensors 46. Computer 16 receives, in real-time, the pitch information from computer 14. Pitching machine 50 contains a second ball. Pitching machine 50 receives, in real-time, the pitch information from computer 16 and, in response, pitches the second ball toward second catcher base 32 based on the pitch information. Hit sensors 46 obtain hit information of the second ball as manually hit when pitching machine 50 pitched the second ball. Computer 16 receives, in real-time, the hit information from hit sensors 46. Computer 14 receives, in real-time, the hit information from computer 16. Fielding machine 72 contains a third ball. Fielding machine 72 receives, in real-time, the hit information from computer 14, and, in response, fields the third ball based on the hit information.

The first ball is pitched at a first distance from first catcher base 32. The second ball is pitched at a second distance from second catcher base 32. The first distance is sufficiently different from the second distance such that latency is effectively minimized. For example, the first distance can be greater than the second distance such that a time delay is created based on a difference between the first distance and the second distance. Such time delay allows for sensors 46 to obtain the pitch information and communicate, in real-time, the obtained pitch information to computer 14 for subsequent communication to computer 16 so that pitching machine 50 can pitch the second ball based on the pitch information. Therefore, gameplay can appear to be relatively in real-time. Similarly, the first distance can be less than the second distance since pitching machine 50 can propel the second ball at a rate faster than the first ball to make up for lost time. Latency can include at least one of processing lag, processing delay, network bandwidth delay, and so forth.

The second ball is hit at a second distance from second area 40. The third ball is fielded at a first distance from first area 40. The second distance is sufficiently different from the first distance such that latency is effectively minimized. For example, the second distance is greater than the first distance that a time delay is created based on a difference between the second distance and the first distance. Such time delay allows for sensors 46 to obtain the hit information and communicate, in real-time, the obtained hit information to computer 16 for subsequent communication to computer 14 so that fielding machine 72 can field the second ball based on the hit information. Therefore, gameplay can appear to be relatively in real-time. Similarly, the second distance can be less than the first distance since fielding machine 72 can propel the third ball at a rate faster than the second ball to make up for lost time. Latency can include at least one of processing lag, processing delay, network bandwidth delay, and so forth.

Field A has a pitcher standing in a pitching position for pitching the first ball. The pitcher is in first area 40 and facing fielding machine 72. Field B has a batter standing in a batting position for batting the second ball. The batter is proximal to second catcher base 32 and facing pitching machine 50. Therefore, at least one of possibilities is possible. First, the pitcher pitches the first ball toward an artificial body representation of the batter in the batting position, such as via entity 122. The batter representation is proximal to first catcher base 32 and facing the pitcher such that the pitcher perceives the batter facing the pitcher. The batter representation mimicking, in real-time, a movement of the batter in the batting position. Second, the batter facing an artificial body representation of the pitcher in the pitching position, such as via entity 122. The pitcher representation in second area 40 and facing the batter such that the batter perceives the pitcher facing the batter. The pitcher representation mimicking, in real-time, a movement of the pitcher in the pitching position.

The batter representation base-traveling, in real-time, such as via wheels 110 in field A based on the batter base-running in field B. The batter representation mimicking, in real-time, a movement of the batter base-running in field B during the base-traveling, such as via wheels 110. At least one of the batter representation and the pitcher representation includes at least one of a mannequin and a hologram, such as output via device 12 and including beam 122 with entity 124 therein.

Field A has a plurality of players fielding field A. Field B has a plurality of artificial body representations of the players, such as the mannequins and machines 106. The representations are spread apart, in real-time, in field B according to the players fielding the field A. The representations mimicking, in real-time, a plurality of movements of the players fielding field A. At least one of the representations including at least one of a mannequin and a hologram, such as output via device 12 and including beam 122 with entity 124 therein.

Field A has a plurality of players fielding field A. Field A has a plurality of paths 128 spanning between first plurality of bases, such as between first catcher base 32 and base 34 and between first catcher base 32 and base 38. Paths 128 illuminating, in real-time, according to a base-running progress of a batter base-running in field B. The illuminating is sufficiently bright for visibility, in real-time, to the players fielding field A. Computer 14 receiving, in real-time, information indicative of the progress from computer 16 to facilitate the illuminating.

Field A has a plurality of players fielding field A. At least one of the players having a glove 102 equipped with hardware 104 configured to determine a catch of the third ball via glove 102. Hardware 104 providing, in real-time, information indicative of the catch to computer 14 for communication, in real-time, to computer 16 in order to automatically determine if a base runner in field B is safe.

The second ball is hit via a bat 98 equipped with hardware configured to determine a hit via bat 98. Hardware 100 providing, in real-time, information indicative of the hit to the computer 16 for communication, in real-time, to computer 14 in order to facilitate fielding of the third ball via fielding machine 72.

The second ball, such as ball 94, is equipped with at least one of flight characteristic hardware 96 and impact characteristic hardware 96. At least one of flight hardware 96 and impact hardware 96 communicating, in real-time, with computer 16 to provide, in real-time, relevant information to computer 14 in order to facilitate fielding of the third ball via fielding machine 72.

The third ball, such as ball 94, having at least one of flight characteristic hardware 96 and impact characteristic hardware 96. At least one of flight hardware 96 and impact hardware 96 communicating, in real-time, with computer 14 to provide, in real-time, relevant information to computer 16 in order to automatically determine whether a base runner in field B is safe.

At least one base 130 of second plurality of bases 32, 34, 36, 38 is equipped with a base contact sensor 132 configured to determine a base contact by a base runner during gameplay. Computer 16 is in communication with contact sensor 132. Computer 16 receives, in real-time, information indicative of the contact from contact sensor 132. At least one of computer 14 and computer 16 memorializing, in real-time, the runner as safe based on the contact information and relevant gameplay information.

Field A has a plurality of players fielding field A. At least one base 130 of first plurality of bases 32, 34, 36, 38 is equipped with a base contact sensor 132 configured to determine a base contact by at least one of the players during gameplay. Computer 14 is in communication with contact sensor 132. Computer 14 receives, in real-time, information indicative of the contact from contact sensor 132. At least one of computer 14 and computer 16 memorializing, in real-time, a base runner on field B as safe based on the contact information and relevant gameplay information.

Field A has a plurality of ball fielding sensors, such as at least one of mobile phone 138 and sensors 46, arranged thereabout. Fielding sensors, such as at least one of mobile phone 138 and sensors 46, obtaining fielding information of the third ball when fielded via fielding machine 72. Computer 14 receives, in real-time, the fielding information from the fielding sensors, such as at least one of mobile phone 138 and sensors 46. Computer 16 receives, in real-time, the fielding information from computer 14. At least one of computer 14 and computer 16 memorializing, in real-time, a batter as safe based on the fielding information.

A third computer, such as computer 136, playing a video game updated, in real-time, based on data received, in real-time, from computer 14 and computer 16 according to relevant information obtained regarding at least one of the first ball, the second ball, and the third ball during gameplay via field A and field B.

At least one of field A and field B having a plurality of spectator mobile phones, such as computers 138, positioned in proximity thereof during gameplay. The phones functioning as a plurality of reference points for ball tracking, in real-time, during the gameplay.

Accordingly, in some embodiments, baseball gameplay is less dependent on weather because baseball games can be remotely played indoors between field A and field B with substantially reduced exposure to snow, rain, winds, and so forth. Further, in some embodiments, baseball gameplay is less dependent on travel because baseball games can be remotely played between field A and field B with respective baseball teams remaining in their respective locales, which is less time-consuming, less expensive, less tiring, and less logistically complicated. Additionally, in some embodiments, baseball gameplay is less dependent on limited team pool because baseball games can be remotely played between field A and field B with less constraint by security situations, geopolitics, and complicated logistics.

Aspects of the present disclosure may be embodied as a system, a method, and/or a computer program product. Accordingly, some implementations of the present disclosure may be embodied in an entirely hardware embodiment, an entirely software embodiment (including firmware, resident software, micro-code, and so forth) and/or an embodiment combining software and hardware aspects that may all generally be referred to herein as a "circuit," "module" or "system." Furthermore, some implementations of the present disclosure may take the form of a computer program product embodied in at least one computer readable medium having computer readable program code embodied thereon. Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present disclosure, a computer readable storage medium may be any tangible medium that can contain, or store a program for use by or in connection with an instruction execution system, apparatus, and/or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by and/or in connection with an instruction execution system, an apparatus and/or a device.

Program code embodied on a computer readable medium may be transmitted using any appropriate medium, including but not limited to wireless, wired, optical fiber cable, radio frequency, and so forth, or any suitable combination of the foregoing. Computer program code for carrying out operations for aspects of the present disclosure may be written in any combination of one or more programming languages, including an object oriented programming language, such as Java, Smalltalk, C#, C++ or the like, and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). Note that, in some alternative implementations, the functions noted in the block may occur out of the order noted in the figures. For example, two blocks shown in succession may be executed substantially concurrently, or the blocks may sometimes be executed in the reverse order, depending upon the functionality involved. Each block of the block diagrams and/or flowchart illustration, and combinations of blocks in the block diagrams and/or flowchart illustration can be implemented by special purpose hardware-based systems that perform the specified functions or acts, or combinations of special purpose hardware and computer instructions. The flow diagrams depicted herein are just one example. There may be many variations to this diagram or the steps (or operations) described therein without departing from the spirit of the disclosure. For instance, the steps may be performed in a differing order or steps may be added, deleted, and/or modified. All of these variations are considered a part of the claimed disclosure.

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be fully exhaustive and/or limited to the disclosure in the form disclosed. Many modifications and variations in techniques and structures are apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of the present disclosure.

What is claimed is:

1. A system comprising:
   a first computer in communication with a plurality of pitch sensors and a fielding machine, said first computer associated with a first field having a first pitching area and a first plurality of bases including a first catcher base, said first field having said plurality of pitch sensors arranged thereabout, said fielding machine proximal to said first catcher base;
   a second computer in communication with a pitching machine and a plurality of hit sensors, said second computer associated with a second field having a second pitching area and a second plurality of bases including a second catcher base, said second pitching area having said pitching machine, said second field having said plurality of hit sensors arranged thereabout,
   wherein said plurality of pitch sensors obtaining pitch information of a first ball as manually pitched from said first pitching area toward said first catcher base, said first computer receiving, in real-time, said pitch information from said pitch sensors, said second computer receiving, in real-time, said pitch information from said first computer, said pitching machine containing a second ball, said pitching machine receiving, in real-time, said pitch information from said second computer and, in response, pitching said second ball toward said second catcher base based on said pitch information, said plurality of hit sensors obtaining hit information of said second ball as manually hit when said pitching machine pitched said second ball, said second computer receiving, in real-time, said hit information from said plurality of hit sensors, said first computer receiving, in real-time, said hit information from said second computer, said fielding machine containing a third ball, said fielding machine receiving, in real-time, said hit information from said first computer, and, in response, fielding said third ball based on said hit information.

2. The system of claim 1, wherein said first ball is pitched at a first distance from said first catcher base, said second ball is pitched at a second distance from said second catcher base, said first distance is sufficiently different from said second distance such that latency is effectively minimized.

3. The system of claim 1, wherein said second ball is hit at a second distance from said second pitching area, said third ball is fielded at a first distance from said first pitching area, said second distance is sufficiently different from said first distance such that latency is effectively minimized.

4. The system of claim 1, wherein said first field having a pitcher standing in a pitching position for pitching said first ball, said pitcher in said first pitching area and facing said fielding machine, said second field having a batter standing in a batting position for batting said second ball, said batter proximal to said second catcher base and facing said pitching machine,
   at least one of said pitcher pitching said first ball toward an artificial body representation of said batter in said batting position, said artificial body representation of said batter proximal to said first catcher base and facing said pitcher such that said pitcher perceives said batter facing said pitcher, said artificial body representation of said batter mimicking, in real-time, a movement of said batter in said batting position,
   said batter facing an artificial body representation of said pitcher in said pitching position, said artificial body representation of said pitcher in said pitching second area and facing said batter such that said batter perceives said pitcher facing said batter,
   said artificial body representation of said pitcher mimicking, in real-time, a movement of said pitcher in said pitching position.

5. The system of claim 4, wherein said artificial body representation of said batter base-traveling, in real-time, in said first field based on said batter base-running in said second field, said artificial body representation of said batter mimicking, in real-time, a movement of said batter base-running in said second field during said base-traveling.

6. The system of claim 5, wherein at least one of said artificial body representation of said batter and said artificial body representation of said pitcher includes at least one of a mannequin and a hologram.

7. The system of claim 1, wherein said first field having a plurality of players fielding said first field, said second field having a plurality of artificial body representations of said plurality of players, said plurality of artificial body representations of said plurality of players spread apart, in real-time, in said second field according to said plurality of players fielding said first field, said plurality of artificial body representations of said plurality of players mimicking, in real-time, a plurality of movements of said plurality of players fielding said first field.

8. The system of claim 7, wherein at least one of said plurality of artificial body representations of said plurality of players includes at least one of a mannequin and a hologram.

9. The system of claim 1, wherein said first field having a plurality of players fielding said first field, said first field having a plurality of paths spanning between said first plurality of bases, said plurality of paths illuminating, in real-time, according to a base-running progress of a batter base-running in said second field, said plurality of paths illuminating sufficiently bright for visibility, in real-time, to said plurality of players fielding said first field, said first computer receiving, in real-time, information indicative of said base-running progress from said second computer to facilitate said plurality of paths illuminating.

10. The system of claim 1, wherein said first field having a plurality of players fielding said first field, at least one of said plurality of players having a glove equipped with hardware configured to determine a catch of said third ball via said glove, said hardware providing, in real-time, information indicative of said catch to said first computer for communication, in real-time, to said second computer in order to automatically determine if a base runner in said second field is safe.

11. The system of claim 1, wherein said second ball is hit via a bat equipped with hardware configured to determine a hit via said bat, said hardware providing, in real-time, information indicative of said hit to said second computer for communication, in real-time, to said first computer in order to facilitate fielding of said third ball via said fielding machine.

12. The system of claim 1, wherein said second ball is equipped with at least one of flight characteristic hardware and impact characteristic hardware, at least one of said flight characteristic hardware and said impact characteristic hardware communicating, in real-time, with said second computer to provide, in real-time, relevant information to said first computer in order to facilitate fielding of said third ball via said fielding machine.

13. The system of claim 1, wherein said third ball having at least one of flight characteristic hardware and impact characteristic hardware, at least one of said flight characteristic hardware and said impact characteristic hardware communicating, in real-time, with said first computer to provide, in real-time, relevant information to said second computer in order to automatically determine whether a base runner in said second field is safe.

14. The system of claim 1, wherein at least one base of said second plurality of bases is equipped with a base contact sensor configured to determine a base contact by a base runner during gameplay, said second computer in communication with said base contact sensor, said second computer receiving, in real-time, contact information indicative of said base contact from said base contact sensor, at least one of said first computer and said second computer memorializing, in real-time, said base runner as safe based on said contact information and relevant gameplay information.

15. The system of claim 1, wherein said first field having a plurality of players fielding said first field, at least one base of said first plurality of bases is equipped with a base contact sensor configured to determine a base contact by at least one of said plurality of players during gameplay, said first computer in communication with said base contact sensor, said first computer receiving, in real-time, contact information indicative of said base contact from said base contact sensor, at least one of said first computer and said second computer memorializing, in real-time, a base runner on said second field as safe based on said contact information and relevant gameplay information.

16. The system of claim 1, wherein said first field having a plurality of ball fielding sensors arranged thereabout, said plurality of ball fielding sensors obtaining fielding information of said third ball when fielded via said fielding machine, said first computer receiving, in real-time, said fielding information from said plurality of ball fielding sensors, said second computer receiving, in real-time, said fielding information from said first computer, at least one of said first computer and said second computer memorializing, in real-time, a batter as safe based on said fielding information.

17. The system of claim 1, further comprising a third computer playing a video game updated, in real-time, based on data received, in real-time, from at least one of said first computer and said second computer according to relevant information obtained regarding at least one of said first ball, said second ball, and said third ball during gameplay via said first field and said second field.

18. The system of claim 1, wherein at least one of said first field and said second field having a plurality of spectator mobile phones positioned in proximity thereof during gameplay, said plurality of spectator mobile phones functioning as a plurality of reference points for ball tracking, in real-time, during said gameplay.

19. A method comprising:
coupling a first computer to a plurality of pitch sensors and a fielding machine, said first computer associated with a first field having a first pitching area and a first plurality of bases including a first catcher base, said first field having said plurality of pitch sensors arranged thereabout, said first field having said fielding machine proximal to said first catcher base;
coupling a second computer to a pitching machine and a plurality of hit sensors, said second computer associated with a second field having a second pitching area and a second plurality of bases including a second catcher base, said second pitching area having said pitching machine, said second field having said plurality of hit sensors arranged thereabout;
facilitating said plurality of pitch sensors obtaining pitch information of a first ball as manually pitched from said first pitching area toward said first catcher base, said first computer receiving, in real-time, said pitch information from said pitch sensors, said second computer receiving, in real-time, said pitch information from said first computer, said pitching machine containing a second ball, said pitching machine receiving, in real-time, said pitch information from said second computer and, in response, pitching said second ball toward said second catcher base based on said pitch information, said plurality of hit sensors obtaining hit information of said second ball as manually hit when said pitching machine pitched said second ball, said second computer receiving, in real-time, said hit information from said plurality of hit sensors, said first computer receiving, in real-time, said hit information from said second computer, said fielding machine containing a third ball, said fielding machine receiving, in real-time, said hit information from said first computer, and, in response, fielding said third ball based on said hit information.

* * * * *